Figure 3:
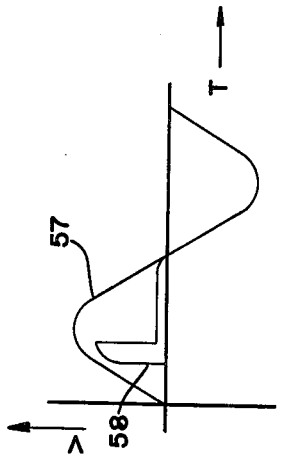

Nov. 21, 1961  J. J. RILEY ET AL  3,010,049
CONTROL CIRCUIT, PARTICULARLY FOR RESISTANCE WELDING
Filed Oct. 20, 1959  12 Sheets-Sheet 1

INVENTOR
JOSEPH J. RILEY
EMMANUEL V. DETHIER
JOHN M. BIGOWSKY
BY Francis J. Klempay
ATTORNEY Nov. 21, 1961   J. J. RILEY ET AL   3,010,049
CONTROL CIRCUIT, PARTICULARLY FOR RESISTANCE WELDING
Filed Oct. 20, 1959   12 Sheets-Sheet 2

INVENTOR
JOSEPH J. RILEY
EMMANUEL V. DETHIER
JOHN M. BIGOWSKY
BY Francis J. Klempay
ATTORNEY

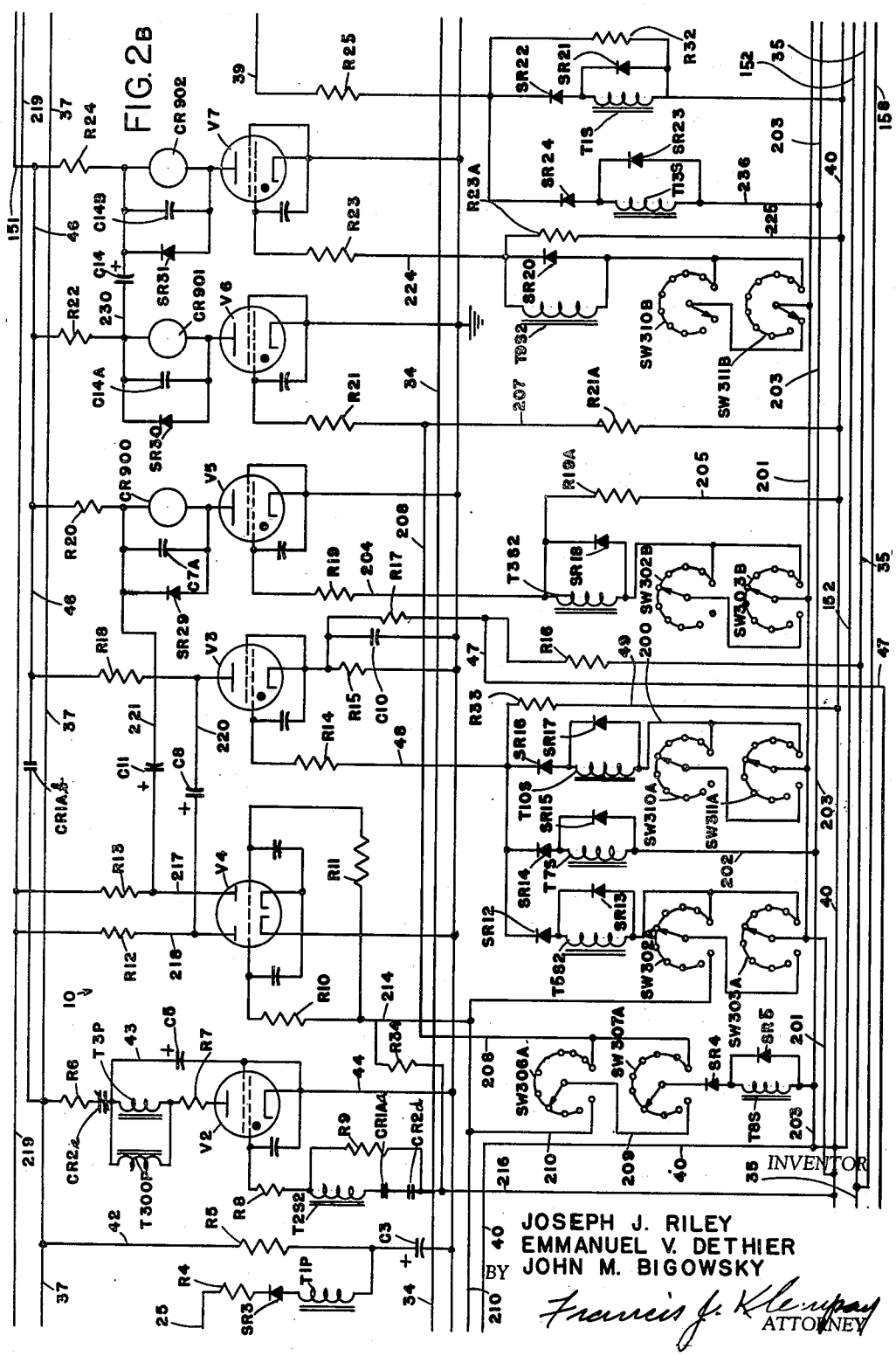

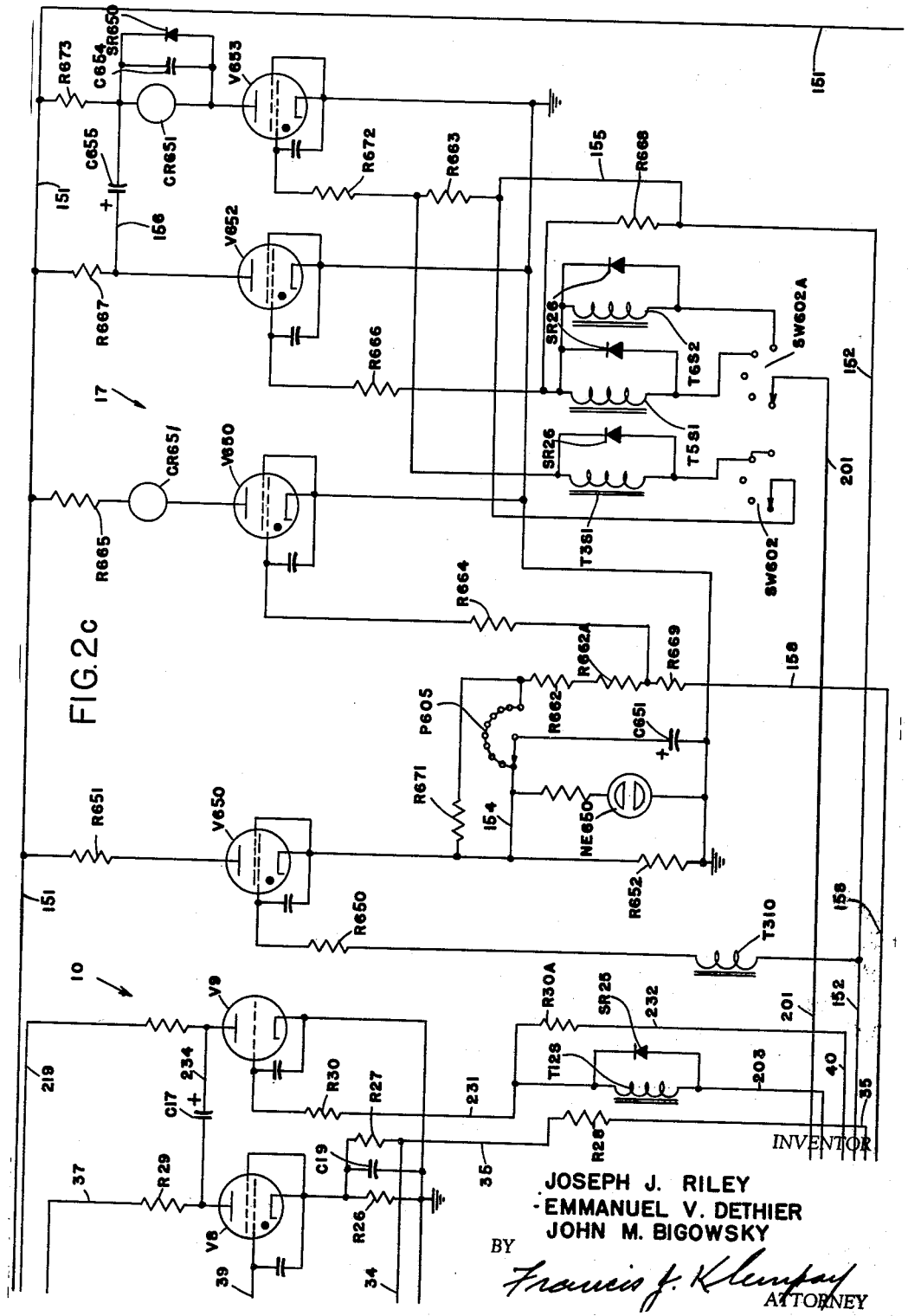

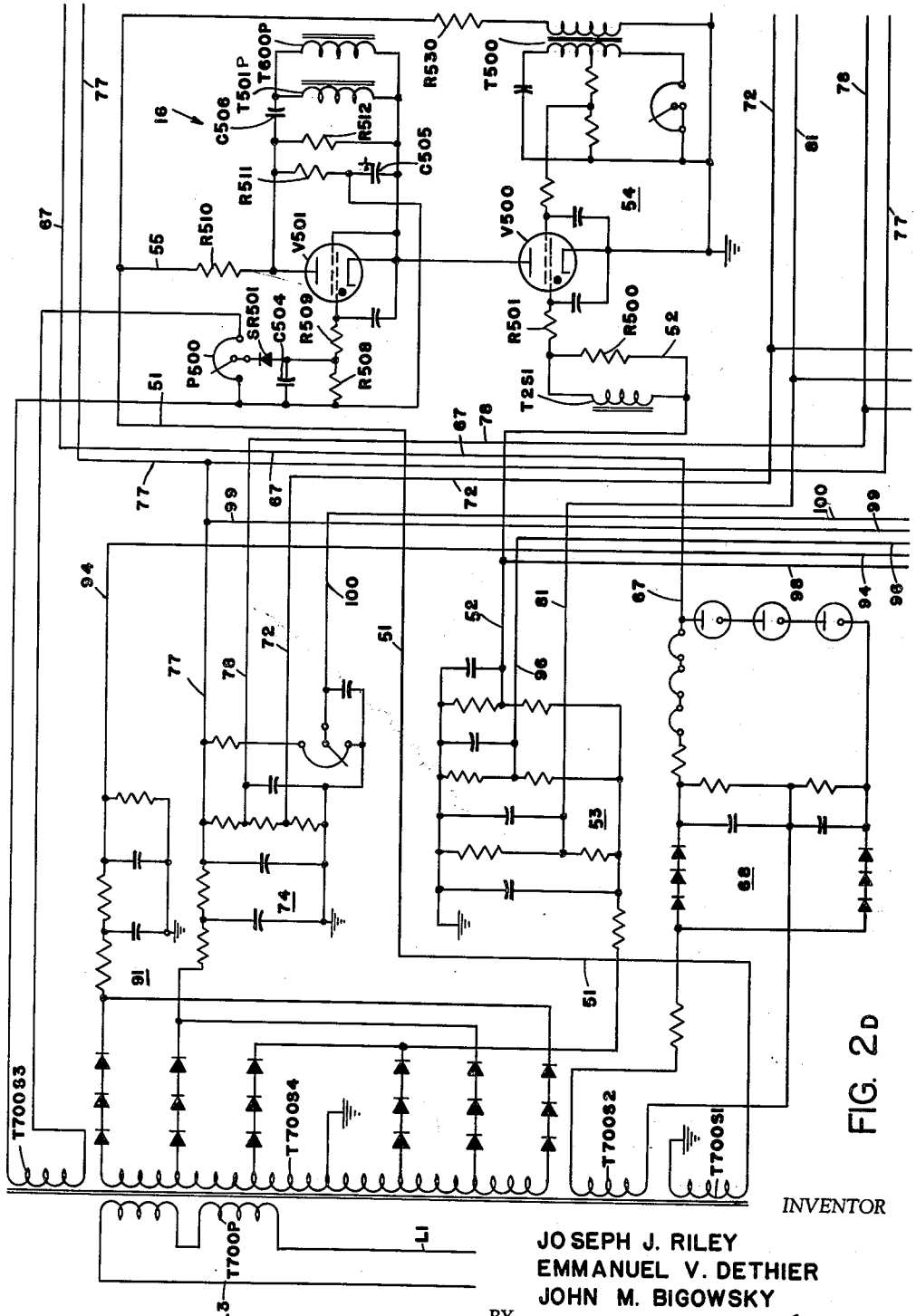

INVENTOR
JOSEPH J. RILEY
EMMANUEL V. DETHIER
JOHN M. BIGOWSKY
BY
ATTORNEY

Nov. 21, 1961 J. J. RILEY ET AL 3,010,049
CONTROL CIRCUIT, PARTICULARLY FOR RESISTANCE WELDING
Filed Oct. 20, 1959 12 Sheets-Sheet 7

INVENTOR
JOSEPH J. RILEY
EMMANUEL V. DETHIER
BY JOHN M. BIGOWSKY
ATTORNEY

INVENTOR
JOSEPH J. RILEY
EMMANUEL V. DETHIER
JOHN M. BIGOWSKY

ATTORNEY

Nov. 21, 1961    J. J. RILEY ET AL    3,010,049
CONTROL CIRCUIT, PARTICULARLY FOR RESISTANCE WELDING
Filed Oct. 20, 1959    12 Sheets-Sheet 9

FIG. 2H

INVENTOR
JOSEPH J. RILEY
EMMANBEL V. DETHIER
JOHN M. BIGOWSKY
BY
Francis J. Klempay
ATTORNEY

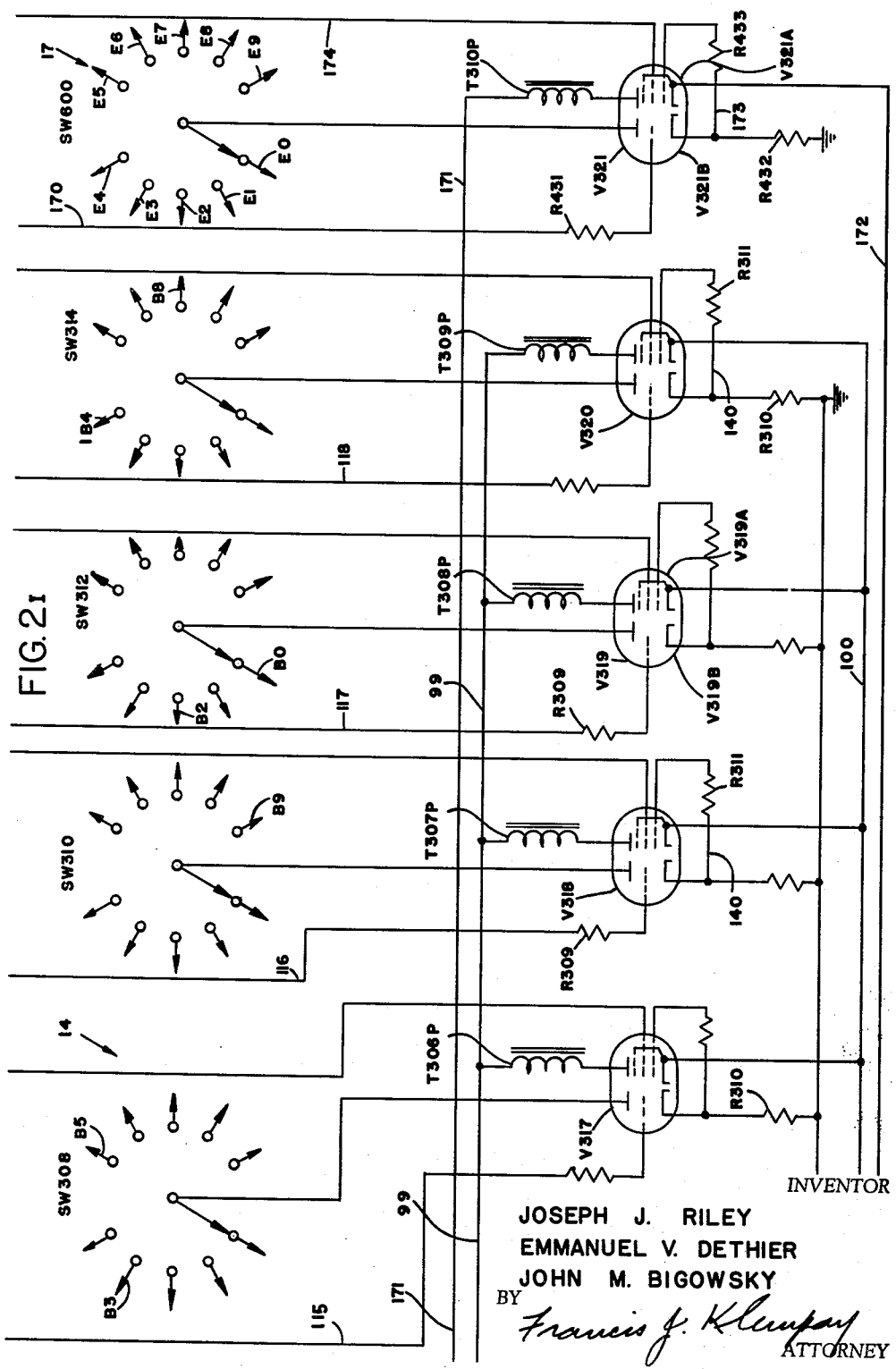

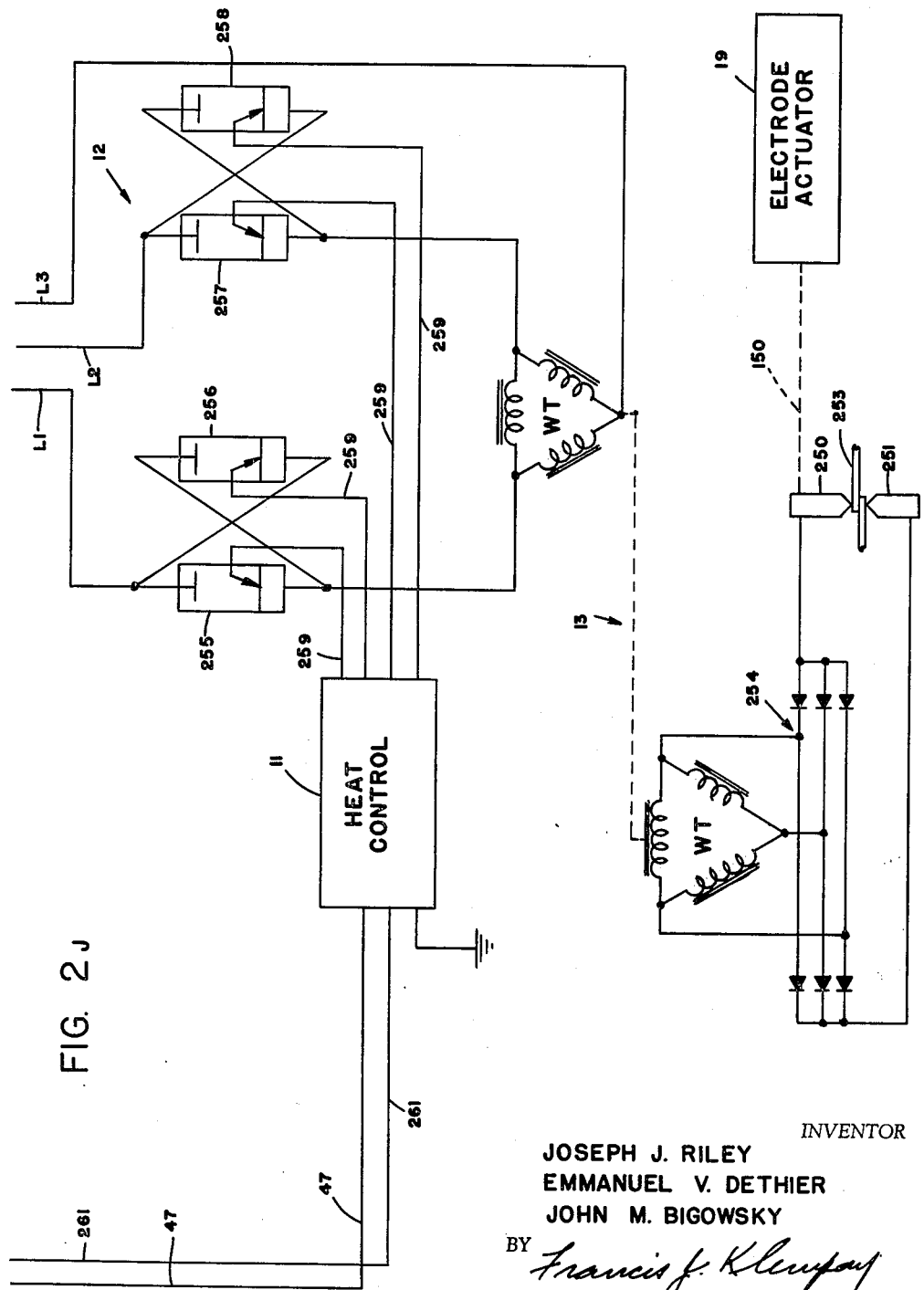

Nov. 21, 1961    J. J. RILEY ET AL    3,010,049
CONTROL CIRCUIT, PARTICULARLY FOR RESISTANCE WELDING
Filed Oct. 20, 1959    12 Sheets-Sheet 12
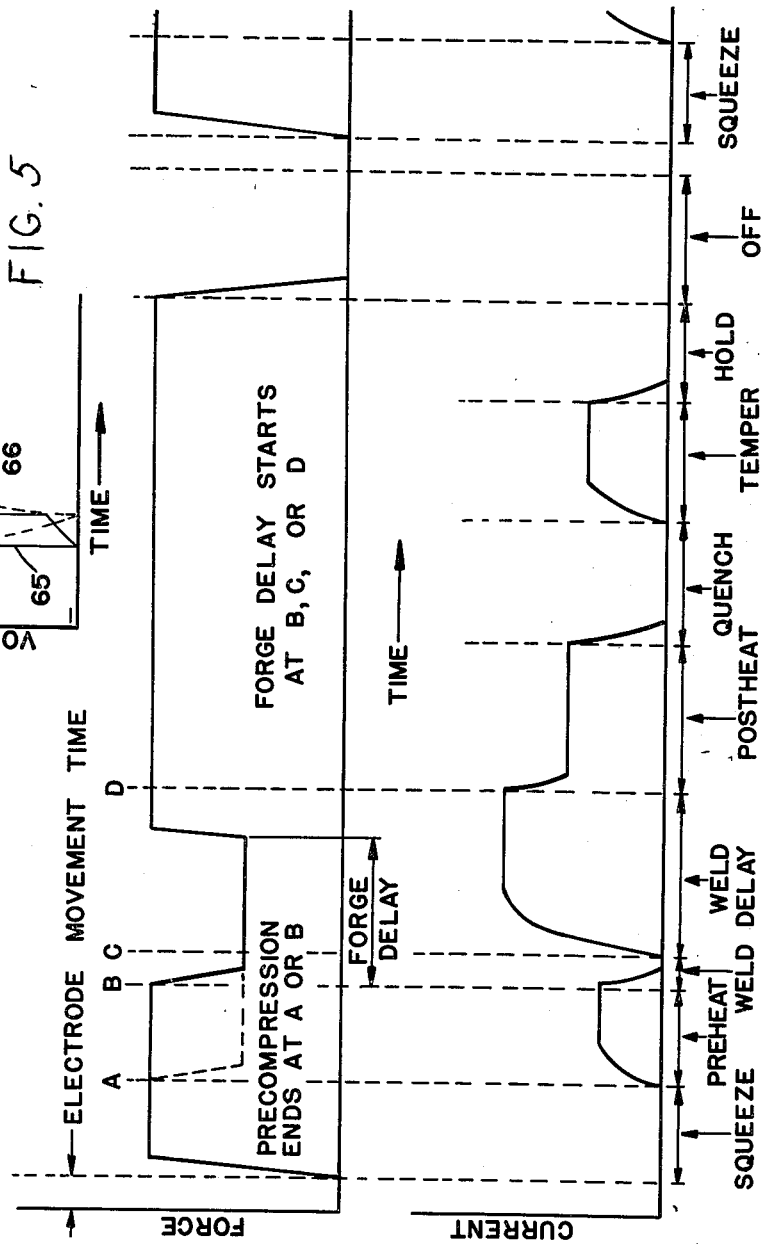
INVENTOR
JOSEPH J. RILEY
EMMANUEL V. DETHIER
JOHN M. BIGOWSKY
BY *Francis J. Klempay*
ATTORNEY United States Patent Office 3,010,049
Patented Nov. 21, 1961

3,010,049
CONTROL CIRCUIT, PARTICULARLY FOR
RESISTANCE WELDING
Joseph J. Riley and Emmanuel V. Dethier, Warren, and
John M. Bigowsky, Youngstown, Ohio, assignors to The
Taylor-Winfield Corporation, Warren, Ohio, a corporation of Ohio
Filed Oct. 20, 1959, Ser. No. 847,607
23 Claims. (Cl. 315—84.6)

The present invention relates generally to the resistance welding art and has to do more particularly with the provision of a highly improved control circuit adapted for use with a resistance welding apparatus. In the illustrated embodiment of the invention, the control circuit is shown employed with a resistance welder of the three-phase rectifier type but it should be understood from the outset that the control circuit and the teachings of the invention are equally applicable for use in connection with other types of resistance welders.

It is well-known in the art to provide an electronic control circuit for automatically timing and controlling the various timed control periods of a welding sequence. However such prior art sequence timers are somewhat limited in their use and application since they are not operative to control complete welding sequence and/or they are not versatile or flexible enough to allow desired changes in the various timed control periods comprising a welding sequence. It is therefore the primary or ultimate object of the present invention to provide a control circuit for resistance welding apparatus and the like which is characterized by its extreme versatility and accuracy. The control circuit is adapted to very accurately time the plurality of successive control periods making up a welding sequence and the length of each one of these control periods is subject to almost unlimited adjustment or it may be eliminated entirely.

Another object of the present invention is to provide a control circuit for resistance welding apparatus and the like which employs dekatron counting tubes in a highly improved manner for counting timed pulses to determine the length of the timed control periods. A pair of dekatron counting tubes are used to determine the length of the various welding current timed control periods while a second pair of dekatron counting tubes is employed to simultaneously control the various welding force timed control periods.

Another object of the invention is to provide a control circuit for resistance welding apparatus employing dekatron counting tubes wherein an improved circuit arrangement is utilized to interconnect the units and tens dekatron counting tubes of each pair thereof.

Still another object of the present invention is to provide a control circuit for resistance welding apparatus embodying an improved and highly simplified counting pulse generator for triggering and switching the various dekatron counting tubes thereof.

A further and particularly important object of the invention is to provide a control circuit using dekatron counting tubes wherein new and novel circuit means are employed to initiate or terminate the timed control periods in response to the counting of the dekatron counting tubes. This means is contained in the sequence steppers portion of the control circuit and comprises a sequence gating valve and a sequence stepper valve associated with each timed control period. Each of the gating valves has a triode section and a pentode section and one of these sections is adapted to be interconnected with a units dekatron counting tube while the other section is adapted to be interconnected with a tens dekatron counting tube.

A further object of the invention is to provide a control circuit for resistance welding apparatus comprising a highly improved sequence coordinator whose various discharge valves are responsive to the dekatron counting tubes through the sequence steppers portion to actually control the welding sequence.

Still another object of the invention is to provide a control circuit of the type above described wherein new and novel safety features are provided to prevent any damage to the control circuit and/or the welder due to a malfunctioning of a component part of the control circuit.

The above, as well as other objects and advantages of the present invention, will become more readily apparent upon consideration of the following specification and accompanying drawing wherein there is disclosed a preferred embodiment of our control circuit.

Figure 4:
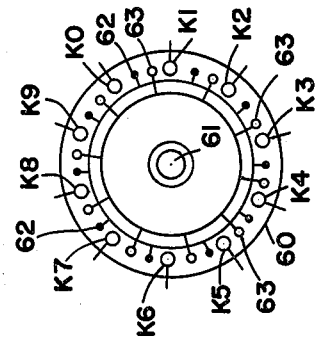
Figure 1:
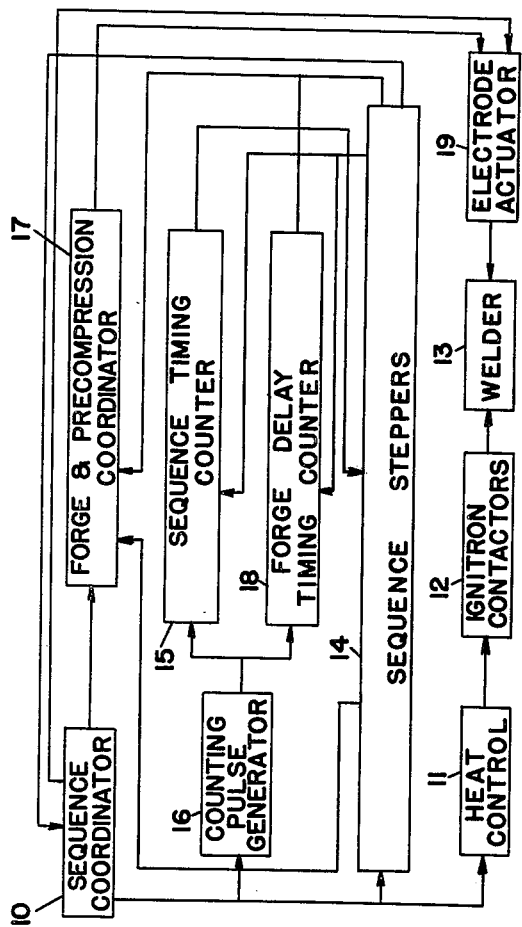
Figure 2A:
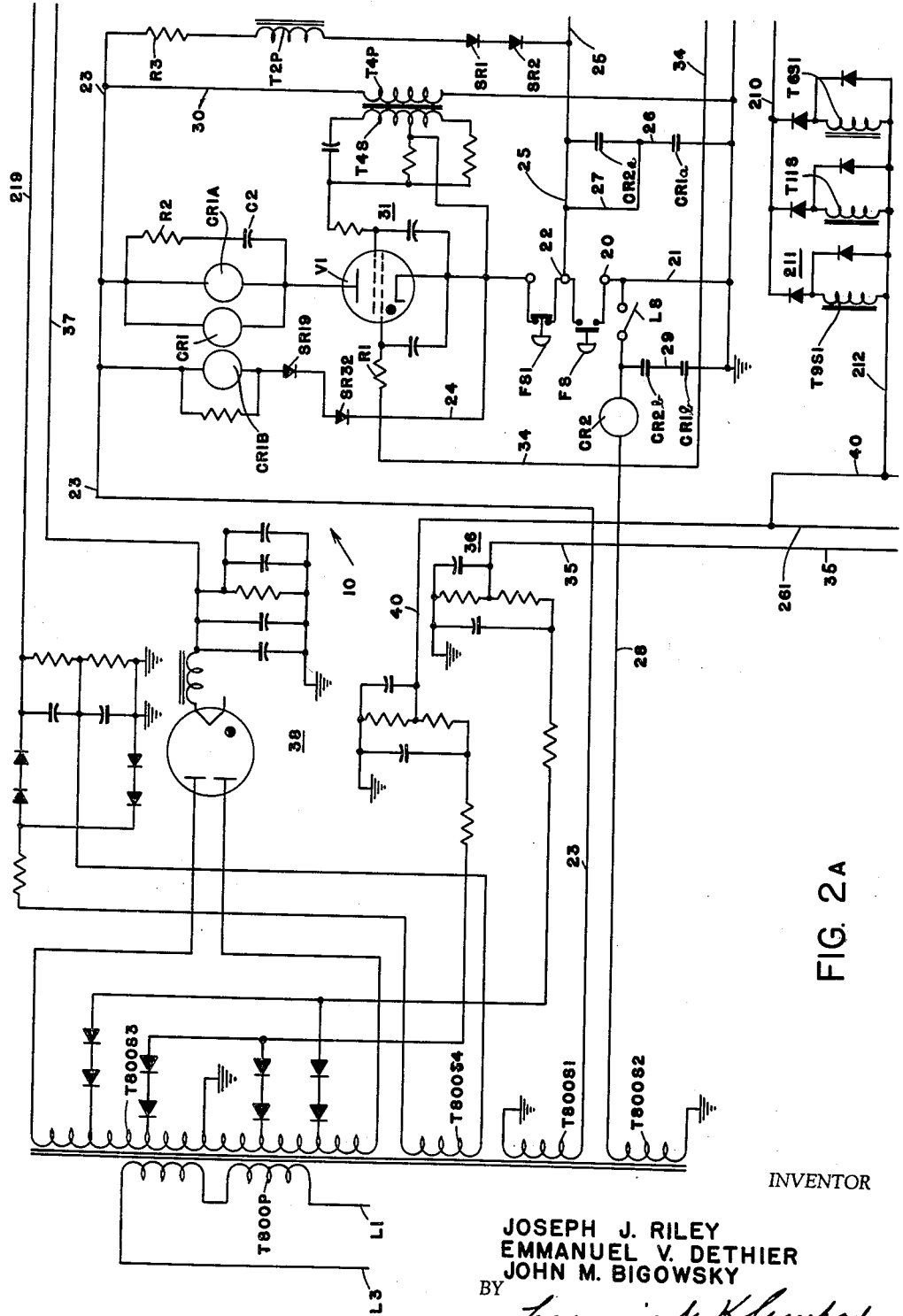
Figure 2E:
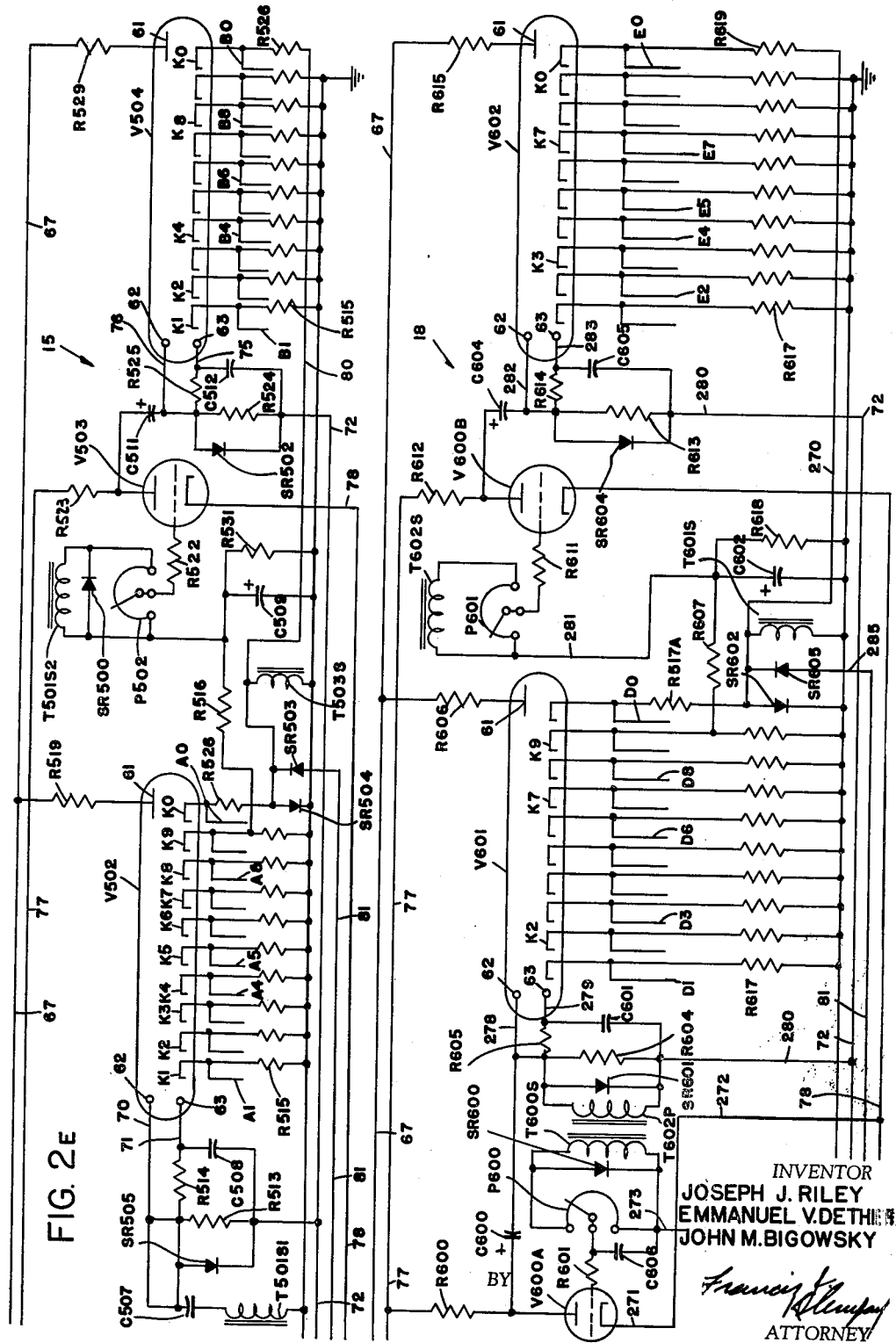
Figure 2F:
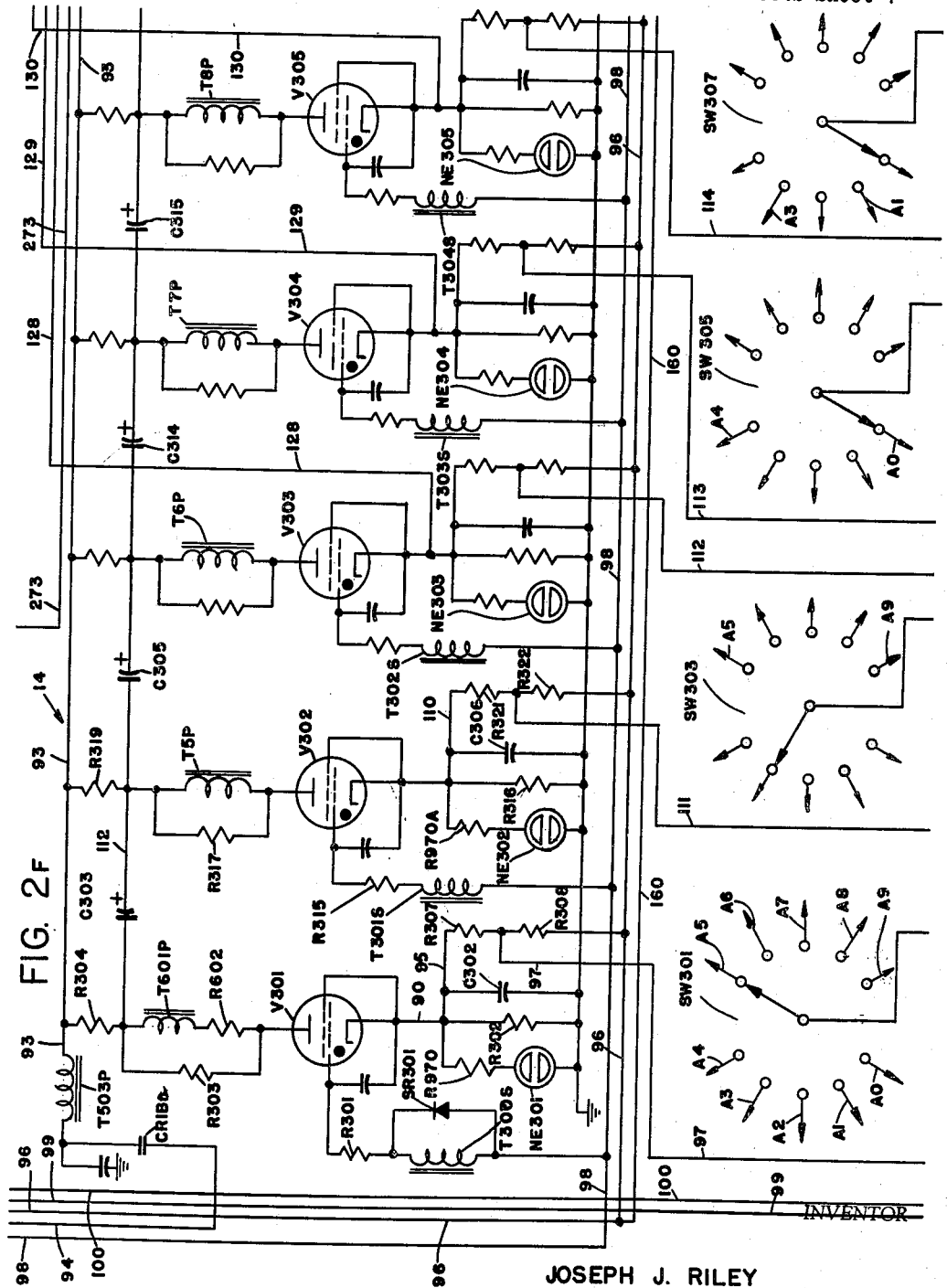
Figure 2G:
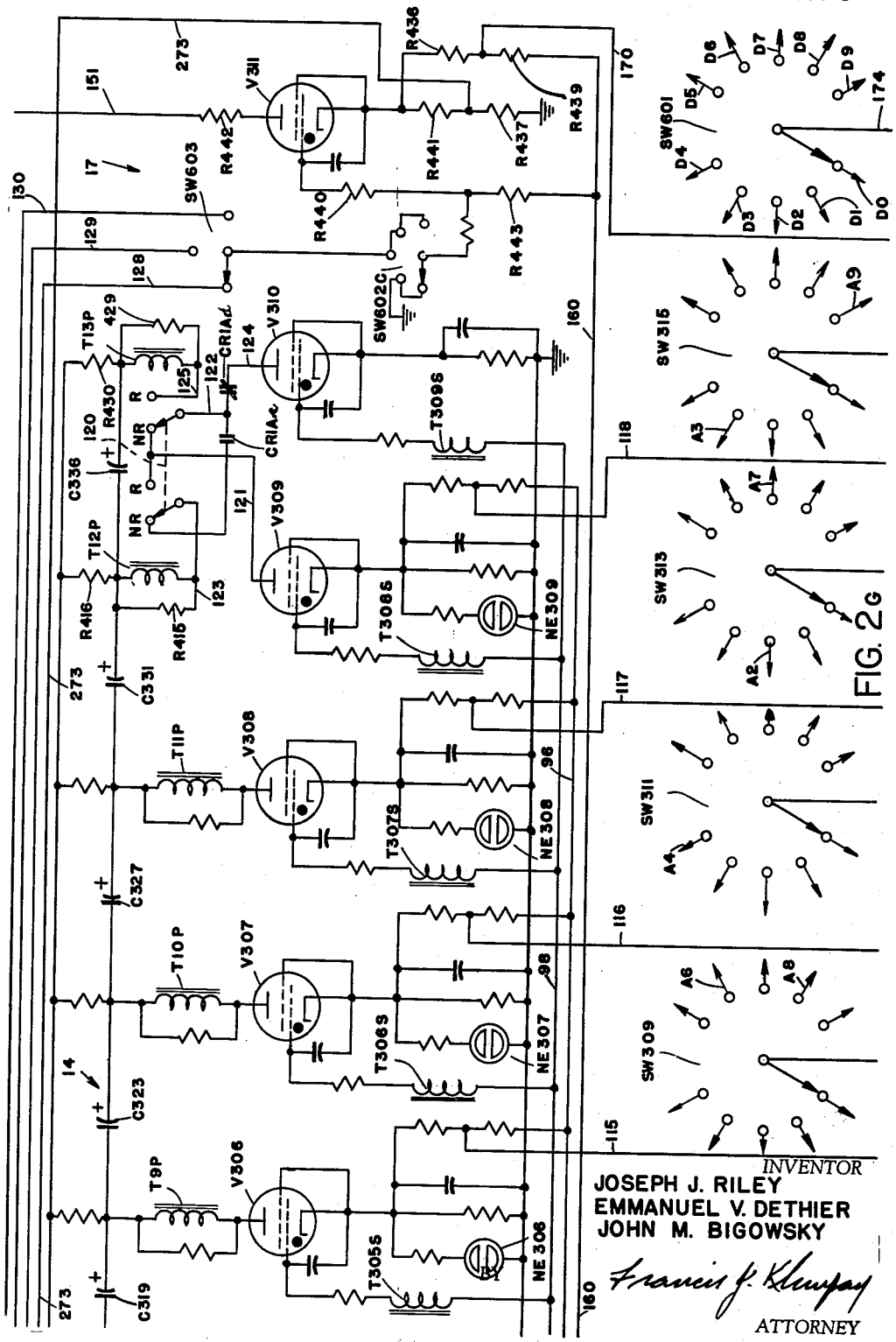

In the drawing:
FIGURE 1 is a block diagram of the control circuit of the present invention;
FIGURE 2, composed of FIGURES 2A through 2J, is a schematic circuit diagram of the control circuit;
FIGURE 3 is a graphical picture of a pulse provided by the counting pulse generator portion of the control circuit;
FIGURE 4 is a schematic plan view of a dekatron counting tube employed in our control circuit;
FIGURE 5 is a graphical representation showing the switching of the discharge from one cathode to another cathode in a dekatron counting tube; and
FIGURE 6 comprises a pair of graphs depicting a typical welding sequence carried out under the control of the control circuit of the present invention.

Referring now to the drawing, and initially to FIGURE 1 thereof, there is shown a block diagram of the control circuit of the present invention. The reference numeral 10 designates a sequence coordinator which is adapted to control and energize a heat control portion 11 and an electrode actuator portion 19. The heat control portion 11 regulates the firing of the ignitron contactors in the ignitron contactors portion 12 to very accurately regulate the flow of welding current in the electrodes of a welder 13 and in the workpieces engaged by these electrodes. The electrode actuator 19 controls the welding force which is applied to the workpieces by the electrodes of the welder 13.

The sequence coordinator 10 is adapted, upon initiation, to energize a counting pulse generator 16 that supplies timed triggering or switching pulses to a sequence timing counters portion 15 and a forge delay timing counters portion 18. The sequence timing counters portion 15 comprises a pair of dekatron counting tubes which operate through a sequence steppers portion 14 to control the sequence coordinator 10. Also, the forge delay timing counters portion 18 comprises a pair of dekatron counting tubes which operate through the sequence steppers portion 14 to control a forge and precompression coordinator 17. The forge and precompression cordinator 17 regulates the electrode actuator 19 to accurately control the welding force timed control periods of a welding sequence. The sequence coordinator 10 regulates the heat control 11 to very accurately control the welding current timed control periods of the welding sequence. The welding current and welding force timed control periods occur simultaneously but it will be noted that the sequence coordinator 10 and the forge and precompression coordinator 17 are interconnected.

To facilitate understanding of the following portions of the specification, the following definitions of the welding current timed control periods used herein are set forth below:

*Squeeze time.*—The time interval after initiation of the control circuit in which the pressure of the electrodes on the workpieces is allowed to build up to a desired value prior to the flow of welding current.

*Preheat time.*—Starts at the end of squeeze time to allow preheat current to flow through the workpieces. May be omitted if desired.

*Weld delay time.*—A fixed time interval occurring at the end of preheat time (or squeeze time if preheat time is omitted) prior to weld time.

*Weld time.*—Begins at the end of weld delay time and is the time in which actual welding current is furnished to the workpieces.

*Postheat time.*—The time in which postheat current flows through the workpieces. Immediately follows weld time and can be omitted.

*Quench time.*—The time interval following postheat time (or weld time if postheat time is omitted) in which welding current does not flow through the workpieces. Can be omitted.

*Temper time.*—Starts at the end of quench time and is the time in which temper current flows through the workpieces. Can be omitted.

*Hold time.*—Follows temper time and is the time interval during which welding force is maintained on the workpieces after current ceases to flow. At the end of hold time the electrodes are retracted from the workpieces.

*Off time.*—Used only in repeat operations. The time interval following hold time prior to the reinitiation of the control circuit.

In addition to the above welding current timed control periods, a number of welding force timed control periods also occur during a welding sequence. These welding force timed control periods occur simultaneously with one or more of the welding current timed control periods and definitions thereof for the purposes of this application are set forth below:

*Precompression time.*—Occurs during squeeze time or during squeeze and preheat times and is the time period during which a relatively high force is applied to the welding electrodes and the workpieces.

*Forge delay time.*—A time interval beginning either at the beginning of weld delay time, weld time or postheat time in which the force applied to the electrodes and the workpieces is maintained at a relatively low value.

In FIGURE 6 of the drawing these various timed control periods are depicted graphically for a conventional welding sequence or operation. All of these timed control periods—with the exception of weld delay time which is fixed and precompression time which is partially variable—are variable in a highly accurate and controlled manner to at least within one-sixtieth of a second corresponding to one complete cycle of a sixty cycle alternating current voltage source. Further, preheat time, postheat time, quench time, temper time, precompression time and forge delay time may either singularly or in any desired combination thereof be omitted from the welding sequence without adversely affecting or interfering in any manner with the remaining timed control periods in a welding operation or the automatic operation of the control circuit. The arrangement is such that a welder equipped with a control circuit constructed in accordance with the teachings of the present invention is extremely versatile in that the various timed control periods may be adjusted or eliminated with a minimum of time and with a minimum of effort as is best adapted for any given welding operation.

In order to facilitate the description of the control circuit the various component portions will be described individually in detail below and the overall operation of the control circuit will be set forth thereafter.

*Welder*

The welder 13 is shown rather schematically in FIGURE 2 of the drawing and comprises a pair of electrodes 250 and 251 which are adapted to engage overlapped workpieces 253. The electrodes 250 and 251 are connected to a rectifier assembly 254 which is in turn connected to the secondary terminals of a three phase delta connected welding transformer WT. The reduced voltage output of the secondary terminals of the welding transformer WT is applied to the rectifier assembly 254 which in turn furnishes direct current to the welding electrodes 250 and 251 and the workpieces 253.

The primary of the three phase welding transformer WT has one terminal thereof connected directly to line L3 leading from the three phase alternating current source, not shown, while the other two terminals of the welding transformer primary are connected to the lines L1 and L2 through the ignitron contactors portion 12 of the control circuit. The flow of current to the electrodes 250 and 251 and the workpieces 253 is controlled by proper energization of the ignitron contactors portion of the control circuit.

Of course, the welder 13 comprises more apparatus than is shown. For example, a fluid circuit under the control of electrode actuator portion 19 is included for moving the electrodes 250 and 251 relative to the workpieces and to provide the proper welding force during welding force timed control periods. Also, the welder 13 would comprise suitable structural apparatus for supporting the various component parts thereof.

*Ignitron contactors*

The ignitron contactors portion 12 of the control circuit interconnects two terminals of the primary of the welder transformer WT with the lines L1 and L2. Line L1 is connected to one terminal of the primary welding transformer WT through a pair of primary discharge valves 255 and 256 which are connected in inverse parallel relation. Similarly, a pair of inversely connected primary discharge valves 257 and 258 are disposed between the line L2 and the third terminal of the primary winding of the welding transformer WT. Each of the primary discharge valves 255–258 is provided with a mercury pool type cathode and an immersion type of ignition electrode whereby the positive and negative half cycles of the alternating current source of the two phases handled by line L1 and of the two phases handled by the line L2 may be transmitted as desired.

The ignition electrode of each of the primary discharge valves 255–258 is connected to a conductor 259 leading to the heat control portion 11 of the control circuit.

*Heat control*

The various component parts of the heat control portion 11 of the present control circuit are not shown in detail and conventional apparatus of a type well known to those skilled in this particular art may be employed. It is the function of the heat control portion 11 to apply to each of the conductors 259 an initiating potential in accordance with the desired value of welding current adapted to flow in the electrodes and the workpieces. As is conventional, the heat control 11 may comprise a firing circuit and valve for each of the primary discharge valves 255–258 and associated control circuits and valves for controlling the conduction of said firing valves.

The heat control portion is connected by conductor 261 and conductor 40 to a negative terminal of a direct current source 38 supplied from power transformer secondary T800S3 to apply negative hold-off bias to the various valves thereof. Also leading to the heat control portion 11 is a conductor 47 that is connected in the cathode circuit of a weld current control valve V3 disposed in the sequence coordinator 10. The arrangement is such that each time the weld current valve V3 conducts a positive signal appears on conductor 47 which is operative to trigger the heat control portion 11 whereby the primary discharge valves 255–258 conduct to provide welding current in the electrodes 250 and 251 and the workpieces 253.

The level or ultimate value of the welding current in the electrodes and workpieces is also under the control of the heat control portion 11. The value of the current for any given timed control period in which current is flowing in the electrodes and workpieces is determined by the setting of certain relay contacts in the heat control portion. As will be hereinafter more fully explained, these relay contacts are adapted to be shifted by the conduction of either a preheat valve V5, a postheat valve V6 or a quench and temper valve V7 disposed in the sequence coordinator 10. The value of the current flowing during any timed control period is adjustable by means of suitable potentiometers or the like in the heat control portion.

Electrode actuator

The electrode actuator 19 of the control circuit comprises apparatus, such as solenoids, for example, for controlling the movement of the electrodes 250–251 and for applying welding force to the electrodes and the workpieces. This apparatus is not shown and in itself does not form a part of the present invention. The electrode actuator is interconnected with the electrodes 250 and 251 by means of a suitable fluid circuit, for example generally designated by the broken line and reference numeral 150 in the drawing.

The component parts and apparatus of the electrode actuator 19 are so connected that upon closure of the foot switch FS and upon energization of the relay CR1 the welding electrodes move into engagement with the workpieces and are adapted to apply a relatively low welding force to the workpieces. However, when a forge valve V651 or a precompression valve V653 conduct to energize the relays CR650 or CR651, respectively, various relay contacts are shifted in the electrode actuator whereby a substantially greater welding force is applied to the workpieces during the time that either of these relays is energized. The valves V651 and V653 and the relays CR650 and CR651 are located in the forge and precompression coordinator 17 of the present control circuit and are actuated in a manner to be hereinafter more fully described. The electrode actuator 19 also contains means for changing the ultimate value of the welding force applied to the electrodes and workpieces during precompression time and forge delay time. The arrangement is such that welding force timed control periods best adapted for any given welding operation may be selected.

Sequence coordinator

The sequence coordinator 10 comprises a foot switch FS having one contact 20 thereof connected to ground by conductor 21 and the other contact 22 thereof connected through a normally closed head release foot switch FS1 to the cathode of a start valve V1. The anode of the start valve V1 is connected through a pair of paralleled relays CR1A and CR1 to the conductor 23 which leads to one terminal of a transformer secondary T800S1. The transformer secondary T800S1 forms a portion of the secondary for the primary T800P of a power supply transformer which is connected across the supply lines L1 and L3. Capacitor C2 and resistor R2 are connected in parallel with the relays CR1A and CR1 to prevent chattering thereof as is conventional in the art. Connected between the conductor 23 and the cathode of the start valve V1 by a conductor 24 is a relay CR1B and a pair of rectifiers SR19 and SR32. The relay CR1B is effectively connected in series with the normally closed head release switch FS1 and the foot switch FS whereby this relay is energized immediately upon closure of the foot switch FS.

Connected by a conductor 25 to the contact 22 of the foot switch FS are a pair of rectifiers SR2 and SR1, a transformer primary T2P and a resistor R3. The transformer primary T2P has one of its secondaries T2S1 connected in the counting pulse generator portion 16 of the control circuit and the other secondary connected in the grid circuit of squeeze valve V2 as will be later described and it will be noted that a current will flow in the transformer primary T2P when the foot switch FS is closed. Also connected to the contact 22 of the foot switch FS via the conductor 25 is a conductor 26 having the normally open relay contacts CR1a and CR2a disposed therein. A conductor 27 is connected to the conductor 25 at one end and to the conductor 26 at its other end in shunting relation with the relay contacts CR2a. This provides, in essence, a circuit which allows the foot switch FS to be released upon energization of the relay CR1 without interrupting the operation of the control circuit.

Connected in series with the contact 20 of the foot switch FS is a pressure sensitive mechanically operated limit switch LS which is adapted to close automatically when a specific welding force is developed on the workpieces and a relay CR2, these last mentioned circuit elements being connected to one terminal of the transformer secondary T800S2 by conductor 28. Joining the conductor 28 between the relay CR2 and the limit switch LS is a conductor 29 having normally open relay contacts CR2b and CR1b interposed therein.

Connected across the conductor 23 and ground by a conductor 30 is a transformer primary T4P whose associated secondary T4S is disposed in a phase shift circuit generally designated by the reference numeral 31 connected between the screen grid and cathode of the start valve V1. A phase shifted alternating current voltage is applied to the screen grid of start valve V1 by the phase shift circuit 31 which prevents partial conduction of this valve during any positive half cycle of the voltage appearing across transformer secondary T800S1. The control grid of the start valve V1 is connected through a resistor R1 and a conductor 34 to a bias network comprising resistors R26 and R27 and capacitor C19. This network is connected by conductor 35 through resistor R28 to a negative terminal of a direct current source 36 which is in turn supplied from the transformer secondary T800S3. The arrangement is such that the grid bias network consisting of resistors R26 and R27 capacitor C19 is operative to apply a normally negative hold-off bias on the grid of start valve V1 which maintains the same normally non-conductive.

The resistor R26 is connected between ground and the cathode of an initiating valve V8 whose anode is connected by conductor 37 and resistor R29 to a positive terminal of a direct current source 38 which is supplied by transformer secondary T800S3. The grid circuit of initiating valve V8 comprises resistors R25 and R32 conductor 39 and a conductor 40 leading to a negative terminal of the direct current source 38. The arrangement is such that the initiating valve V8 is normally held non-conductive due to a negative hold-off voltage impressed on its grid.

Connected across and in parallel with the resistor R32 is a rectifier SR22 and a transformer secondary T1S which is paralleled by a rectifier SR21. The primary T1P associated with the transformer secondary T1S, along with a resistor R4 and a rectifier SR3, are disposed in the conductor 25 which is connected to a conductor 42 between the resistor R5 and a capacitor C3. The conductor 42 is connected across the conductor 37 and ground whereby the capacitor C3 is normally charged with the upper terminal thereof positive. When the foot switch FS is closed and the relay CR1 is actuated a discharge circuit for the capacitor C3 is provided. A signal is thus evidenced in the transformer secondary TS1 which drives the grid of initiating valve V8 positive whereby this valve begins conducting.

The grid circuit for initiating valve V8 further comprises a conductor 236 having a rectifier SR24 and a transformer secondary T13S disposed therein connected across the resistor R32 and leading to a negative terminal of the direct current source 38 via conductors 203 and 40. A rectifier SR23 is disposed across the terminals of transformer secondary T13S. The transformer primary T13P associated with the secondary T13S is connected in the sequence steppers portion 14 of the control circuit as will be later explained. However, it will be noted that when a positive signal is evidenced in the transformer secondary T13S the grid of initiating valve V8 will be driven positive to allow this valve to conduct.

Connected between the conductor 37 and ground is a series circuit including resistor R6, normally closed relay contacts CR2c, conductor 43, capacitor C5 and conductor 44. Capacitor C5 is initially fully charged with the upper terminal thereof assuming a positive potential as shown in the drawing. Connected in parallel with the capacitor C5 is a squeeze valve V2, resistor R7 and parallel connected transformer primaries T3P and T300P. When squeeze valve V2 conducts the capacitor C5 discharges through the transformer primaries T3P and T300P to initiate various functions of the control circuit as will be explained.

The grid circuit of the squeeze valve V2 comprises resistors R8 and R9 which are connected by conductors 216 and 40 to the source 38 whereby a negative hold-off bias is normally applied to the grid of squeeze valve V2. A transformer secondary T2S2 and the normally open sets of relay contacts CR1Aa and CR2d are connected in parallel across resistor R9 whereby upon closure of these relay contacts and proper energization of transformer primary T2P when the foot switch FS and LS is closed the squeeze valve V2 will be rendered conductive.

Connected in parallel relation across the direct current source 38 by a conductor 46 communicating with the conductor 37 and the normally open relay contacts CR1Ab are a weld current control valve V3, a preheat valve V5, a postheat valve V6 and a quench and temper valve V7. The arrangement is such that upon closure of the relay contacts CR1Ab plate potential is supplied to the various valves V3, V5, V6 and V7.

Disposed in series with the valve V3 between the conductor 46 and ground is a resistor R18 and a network comprising resistor R15 and capacitor C10. This network is also referenced to the conductor 35 leading from a negative terminal of the direct current source 36 by a pair of series resistors R17 and R16. Taped intermediate the resistors R16 and R17 is a conductor 47 which leads to the heat control portion 11 of the control circuit. When valve V3 conducts a signal is generated over conductor 47 which is operative to trigger the various valves in the heat control portion which in turn energizes the ignitron contactors of the welder portion 13 of the control to initiate the flow of welding current in the electrodes and workpieces. Every time weld current control valve V3 conducts current will be caused to flow in the electrodes and workpieces. Of course, the value of this current will depend upon the internal settings of the heat control portion and these internal settings are controlled by the conduction of the preheat valve V5, postheat valve V6 and quench and temper valve V7 of the sequence coordinator. Each of these last mentioned valves is operative to actuate a control relay to change the internal settings of the heat control portion. The heat control portion is initially set up for the current desired during actual weld time whereby if only V3 conducts weld current flows while if, for example, both valves V3 and V5 are conducting preheat current will flow in the electrodes and the workpieces.

The grid circuit for the valve V3 comprises a resistor R14, conductor 48, conductor 49 and resistor R33 which are connected between the conductor 40 and the grid of this valve. Thus, a normally negative hold-off bias is supplied to the grid to maintain this valve non-conductive. Also forming a portion of the grid circuit is a rectifier SR16, transformer secondary T10S having a rectifier SR17 in parallel therewith and a pair of interconnected temper tens and units switches SW310A and SW311A, respectively. The tens and units temper SW310A and SW311A are interconnected with the tens and units switches SW310 and SW311 in the sequence steppers portion of the control circuit whereby both of the tens switches SW310 and SW310A will be disposed on like ones of their contacts at all times. This same relation also applies between the units switches SW311 and SW311B. This allows the temper time to be eliminated from the welding sequence as will be more fully apparent. The contacts of the temper switches SW310A and SW311A are so connected that when either or both of their movable pointers are on any contact other than the zero contacts on the left that the transformer secondary T10S is connected to the conductor 40 by the switches and the conductors 200 and 201. However, when the movable pointers of both of the switches SW310A and SW311A are on the left set of contacts this circuit is effectively open. The arrangement is such that when this circuit is closed and a positive pulse is supplied to the transformer secondary T10S the grid of weld current control valve V3 will be driven positive whereby this valve conducts. However, valve V3 will not conduct when the transformer primary associated with the secondary T10S is energized if the movable pointers of switches SW310A and SW311A are both positioned on their zero contacts. This allows temper time to be omitted from the welding sequence.

Further connected in the grid circuit of weld current control valve V3 in parallel with the resistor R33 and conductor 49 is a transformer secondary T7S having a parallel rectifier SR15 and a rectifier SR14. This transformer secondary is connected to the conductor 40 by conductors 202 and 203. When transformer primary T7P is energized the grid of valve V3 is driven positive whereby the same is conditioned for conduction. In addition to the above, the grid circuit for the weld current control valve V3 comprises a rectifier SR12, transformer secondary T5S2 having a rectifier SR13 disposed in parallel relation therewith and tens and units preheat multiple contact switches SW302A and SW303A, respectively, which are connected in parallel across the conductor 49 and the resistor R33. The tens and units preheat switches SW302A and SW303A are associated and interconnected with the preheat tens and units switches SW302 and SW303 in the sequence steppers portion and preheat time may be eliminated from the welding sequence if the movable pointers of switches SW302A and SW303A are both positioned on their zero contacts. The transformer primaries for the secondaries T5S2, T7S and T10S are located in the sequence steppers portion of the control circuit and upon proper energization of any of these primaries—providing the pairs of preheat and temper switches SW302A–SW303A and SW310A–SW311A have their movable pointers in proper positions—the grid of weld current control valve V3 will be driven positive whereby this valve may conduct.

Connected in series with the anode of the preheat valve V5 is a relay CR900 and a resistor R20, the former element having a capacitor C7A and a rectifier SR29 connected in parallel therewith. The contacts of relay CR900 are disposed in the heat control portion 11 of the control circuit and when the valve V5 is rendered conductive the contacts of relay C900 are shifted to change the maximum value of current which will be supplied to the welding electrodes and workpieces during the time valves V3 and V5 are conducting. The grid circuit for preheat valve V5 comprises R19, conductor 204, resistor R19A and conductor 205 which is connected to the conductor 40 leading from a negative terminal of the direct current source 38. There is thus initially applied to the grid of the discharge valve V5 a negative hold-off potential. The grid circuit for preheat valve V5 further comprises transformer secondary T3S2 with its associated parallel rectifier SR18 and tens and units multiple contact preheat switches SW302B and SW303B. These circuit elements are connected between the conductors 204 and 201 in parallel with the resistor R19A and conductor 205. The switches SW302B and SW303B are interconnected with the preheat switches SW302, SW303, SW302A and SW303A whereby the movable pointers of the various sets of switches (each set comprising three interconnected switches) are always on the same corresponding contacts. If transformer secondary T3S2 is energized and providing either of the preheat switches SW302B and SW303B has its movable pointer positioned on any contact but zero the grid of preheat valve V5 will be driven positive whereby the same may conduct. Transformer primary T3P is connected in the anode-cathode circuit of squeeze valve V2 as has been previously explained.

Postheat valve V6 has a relay CR901 and a resistor R22 in series therewith and the relay CR901 is paralleled with a capacitor C14A and a rectifier SR30. When postheat valve V6 is energized the contacts of relay CR901 which are in the heat control portion 11 of the control circuit shift to change the value of the current which can be supplied to the welding electrodes and workpieces during postheat time when valve V3 conducts.

The grid of postheat valve V6 is normally supplied with a negative hold-off bias over a circuit including a negative terminal of direct current source 38, conductor 40, conductor 207, and resistors R21A and R21. A conductor 208 joins the conductor 207 intermediate resistors R21 and R21A and leads to the multiple contact tens and units postheat switches SW306A and SW307A. The switches SW306A and SW307A are associated with the tens and units postheat switches in the sequence steppers portion of the control circuit. The movable pointer of switch SW306A is connected by conductor 209 with the zero contact of switch SW307A and the movable pointer of switch SW307A is connected to the conductor 203 through a transformer secondary T8S having a paralleled rectifier SR5 and a rectifier SR4. The zero contact of postheat switch SW306A is connected by conductor 210 to a circuit 211 having three paralleled transformer secondaries T6S1, T11S and T9S1. The circuit 211 is referenced to the conductor 40 by means of conductor 212.

If either of the movable pointers of the postheat switches SW306A and SW307A are positioned on any contact other than the zero contact then the transformer secondary T8S will be connected in the grid circuit of valve V6. If the movable pointers of postheat switches SW306A and SW307A are both positioned on their zero contacts then the transformer secondary T8S will not be connected in the grid circuit of valve V6 but will be connected in parallel with the circuit 211. The postheat switches SW306A and SW307A provide a means for switching the transformer secondary T8S from the grid circuit of the postheat valve V6 to the grid circuit of another valve whereby the posheat time of the welding sequence may be eliminated.

The circuit 211 is connected by conductor 214 and resistors R10 and R11 to the grids of a dual triode vacuum tube V4 which serves as an extinguishing valve as will be hereinafter more fully apparent. The arrangement is such that extinguishing valve V4 is adapted to be rendered conductive whenever a positive control signal is experienced in any of the transformer secondaries T9S1, T11S, T6S1 or T8S—providing the postheat switches SW306A and SW307A have both of their movable pointers positioned on the zero contacts. Normally negative hold-off bias is supplied to the grids of extinguishing valve V4 over a circuit comprising resistors R10 and R11, conductor 214, resistor R34, conductor 216 and conductor 40.

The cathodes of the extinguishing valve V4 are connected to ground while the anodes thereof are connected to a positive terminal of source 38 which is supplied by transformer secondary T800S4 by means of conductors 217 and 218, resistors R13 and R12 and conductor 219. Interconnecting one anode of the extinguishing valve V4 and the anode of the weld current control valve V3 is a conductor 220 and capacitor C8 which is adapted to be charged with the left terminal thereof positive upon conduction of the valve V3. The other anode of the extinguishing valve V4 is connected to the anode circuit of the postheat valve V5 by conductor 221 and capacitor C11 which is charged with the left terminal thereof positive upon energization of the relay CR900 and conduction of the valve V5. If valve V3 is conducting whereby capacitor C8 is charged and the left triode section of extinguishing valve V4 is allowed to conduct a discharge circuit for the capacitor C8 is completed which allows the application of a negative voltage on the anode of weld current control valve V3 that renders the same non-conductive. This same relationship and operation holds true for the right triode section of extinguishing valve V4, capacitor C11 and preheat valve V5.

The quench and temper valve V7 has a resistor R24 and a relay CR902 in series with the anode thereof and in parallel with this relay is a capacitor C14B and rectifier SR31. The contacts of relay CR902 are disposed in the heat control portion of the control circuit and when shifted are operative to change the value of the current supplied to the electrodes and the workpieces during temper time of the welding sequence. The grid circuit for quench and temper valve V7 comprises a resistor R23, conductor 224, resistor R23A and conductor 225 leading to the conductor 40. Disposed in parallel with the resistor R23A and forming a portion of the grid circuit for valve V7 is a transformer secondary T9S2 having a rectifier SR20 associated therewith and tens and units temper switches SW301B and SW311B which are connected to conductor 201. The temper switches SW301B and SW311B are associated with the switches SW310, SW311, SW310A and SW311A in exactly the same manner as the various tens and units preheat switches as above described. The arrangement is such that a normally negative hold-off bias is applied to the quench and timer valve V7 but this valve is rendered conductive as a positive control signal is evidenced in the transformer secondary T9S2 if either of the movable pointers of the switches SW310B and SW311B are positioned at any contact other than zero. Positioning the movable pointers of temper switches SW310B and SW311B on the zero contacts effectively disconnects the transformer secondary T9S2 from the grid circuit for quench and temper valve V7.

Interconnecting the anode circuits of postheat valve V6 and quench and temper valve V7 is a conductor 230 having a capacitor C14 therein. Capacitor C14 is charged with the right terminal thereof positive upon conduction of the post heat valve V6. When quench and temper valve V7 fires the capacitor C14 places a negative voltage on the anode of the postheat valve V6 which renders the same non-conductive.

Connected between the ground and conductor 219 is a vacuum type triode extinguishing valve V9. The grid valve V9 is connected to a circuit comprising resistor R30, conductor 231, resistor R30A and conductor 232 leading to the conductor 40 for supplying negative hold-off bias to the grid of this extinguishing valve. Connected in parallel with the resistor R30A and conductor 232 is a transformer secondary T12S with its associated paralleled rectifier SR25. A positive signal in transformer secondary T12S will drive the grid of extinguishing valve V9 positive whereby this valve conducts. The anodes of valves V9 and V8 are tied together by conductor 234 and capacitor C17. This capacitor is charged with the right terminal thereof positive upon conduction of the initiating valve V8 as is shown in the drawing and the initiating valve is rendered non-conductive when the extinguishing valve fires.

The operation and utilization of the sequence coordinator will be further explained in the following portions of the specification. Note is made, however, of the use of vacuum type discharge valves for the extinguishing valves V4 and V9 employed with the various valves that determine current flow in the electrodes and and workpieces. These vacuum type valves and their associated circuits prevent simultaneous conduction of other than the proper valve or valves required in a particular time period when current flows. This a very important safety feature which prevents damage to the control circuit and/or welder should something malfunction.

*Counting pulse generator*

The counting pulse generator 16 comprises a pair of series connected discharge valves V501 and V500. The cathode of the discharge valve V500 is referred to ground while the anode of the discharge valve V501 is connected to one side of transformer secondary T700S1 through a circuit including a resistor R510 and conductor 51. The discharge valves V500 and V501 are thus connected in series across the transformer secondary T700S1.

The control circuit for the grid of discharge valve V500 comprises resistors R501 and R500 and conductor 52 which leads to a negative terminal of a source generally designated by the reference numeral 53. The source 53 is supplied by the transformer secondary T700S4 and the arrangement is such that a negative hold-off bias is supplied to the grid of the discharge valve V500. Connected in parallel relation with the resistor R500 is a transformer secondary T2S1 whose associated primary T2P is energized upon closure of the foot switch FS. The transformer secondary T2S1 is operative to supply a positive control signal which overrides the normally negative hold-off bias supplied to the grid of discharge valve V500 to condition the same for conduction.

The screen grid of discharge valve V500 is connected to a phase shift circuit generally designated by the reference numeral 54 which is supplied by transformer T500. One of the terminals of the primary of transformer T500 is connected to ground while the other primary terminal is connected through a resistor R530, conductor 55 and conductor 51 to a terminal of the transformer secondary T700S1. The phase shifted signal applied to the screen grid of the discharge valve V500 determines the point in a positive half cycle of the anode-cathode voltage thereof when the same will begin to conduct—providing, of course, that the grid of this discharge valve is properly conditioned.

A negative hold-off bias is normally maintained on the grid of the discharge valve V501 by a circuit which includes resistors R509 and R508, capacitor C504, rectifier SR501, potentiometer P500 and a transformer secondary T700S3. The negative voltage appearing across the resistor R508 is impressed between the grid and cathode of the discharge valve V501. A capacitor C505 and the resistor R511 are disposed in parallel relation with respect to the anode-cathode of the discharge valve V501. Also connected in parallel with the discharge valve V501—as well as the capacitor C505 and resistor R511—is a resistor R512 and a pair of transformer primaries T501P and T600P. Disposed in series relation between the resistor R512 and the transformer secondary T501P is a capacitor C506. The various secondaries for the transformer primary T501P are connected in the sequence timing counters portion 15 of the control while the secondary for transformer primary T600P is connected in the forge delay timing counters portion 18 of the control.

Before initiation of the control circuit of the present invention the discharge valves V500 and V501 are both maintained non-conductive due to the negative biases supplied to their respective grids. After initiation by closure of the foot switch FS a positive control signal will appear across the transformer secondary T2S1 which is in opposition to the negative hold-off bias normally maintained on the grid of valve V500. This positive control signal is sufficient to swing the grid of discharge valve V500 positive whereby the same is conditioned for conduction. The phase shifted alternating current voltage applied to the screen grid of the discharge valve V500 determines the point at which this valve will conduct. When the screen grid and the grid voltages are both positive the valve V500 will conduct through a circuit including conductor 51, resistor R510 and resistor R512. Resistor R512 is paralleled by a resistor R511 and a capacitor C505. At this instant in time discharge valve V501 is still non-conductive due to the negative hold-off bias maintained on its grid and the capacitor C505 will begin charging with its upper terminal positive as is indicated in the drawing.

The capacitor C505 continues charging and the potential thereacross soon overrides the negative hold-off bias on the grid of discharge valve V501 whereby this valve is rendered conductive. Conduction of valve V501 limits the voltage drop across resistor R512 to the arc voltage drop of conducting valve V501. When valve V500 conducts the output voltage across resistor R512 is applied through capacitor C505 to transformers T501P and T600P. This voltage drop is suddenly reduced when valve V501 conducts. As a result a square-formed pulse 58 is generated as shown on FIGURE 3, and this pulse is applied to the transformer primaries T501P and T600P through capacitor C506 for triggering the sequence timing counters portion 15 and the forge delay timing counters portion 18 of the control circuit as will be hereinafter more fully described.

As the voltage across the valves V501 and V500 swings negative these valves will be rendered non-conductive. When the voltage thereacross again swings positive valve V500 will again begin to conduct—providing, of course, a signal is evidenced in transformer secondary T2S1—but valve V501 will not begin to conduct until the capacitor C505 has again been charged and the voltage thereon overrides the negative hold-off bias supplied to the grid of this latter valve. A square wave pulse will be generated in the transformer primaries T501P and T600P as previously described.

It will thus be apparent that as long as transformer secondary T2S1 conditions valve V500 for conduction square wave pulses will be evidenced in the transformer primaries T501P and T600P. These pulses will occur at a sixty cycle rate since the valves V501 and V500 are connected in series across a sixty cycle voltage source provided by the transformer secondary T700S1. It will be noted that the power supply transformer primary T700P is connected across the supply lines L1 and L3 and that the power supply transformer primary T800P is connected across these same supply lines. Thus, the positive control signals in the transformer secondary T2S1 will occur in the same phase relationship as the voltage across the series connected valves V501 and V500.

A graphical representation of the operation of the counting pulse generator is shown in FIGURE 3 wherein reference numeral 57 designates one complete cycle the alternating sixty cycle voltage impressed across the series connected valves V501 and V500 while the numeral 58 indicates the square wave pulse occurring in either of the transformer primaries T501 or T600. Of course, the valves V500 and V501 are uni-directional discharged devices and will conduct only on positive half cycles of the supply voltage therefor.

The counting pulse generator employed in the control circuit of the present invention is characterized by its extreme simplicity in construction and operation. A pair of rugged gas filled discharge valves, thyratrons, for example, are utilized to generate square wave counting pulses for stepping or switching the dekatron counting tubes in the sequence timing counters 15 and the forge delay timing counters 18. A single pulse source switches or steps two sets of dekatron counting tubes whereby it is always insured that these counting tubes are stepping or switching synchronously.

*Sequence timing counters*

The sequence timing counters portion 15 of the present control circuit comprises a pair of dekatron counting tubes V502 (units) and the V504 (tens). To facilitate the discussion and understanding of this portion of the control circuit it is first necessary to understand the operation of the dekatron counting tubes.

As shown in FIGURE 4, such a dekatron counting tube comprises a gas filled envelope 60 containing a centrally disposed anode 61 and a plurality of circumferentially spaced cathodes K1–K0 which are positioned radially outward of the anode 61. Positioned between adjacent ones of the cathodes are pairs of first and second guide elements 62 and 63, respectively. The arrangement is such that one of the first guide elements 62 and one of the second guide elements 63 are positioned between any two of the cathodes K1–K0. As shown, all of the first guide elements 62 are interconnected and all of the second guide elements 63 are also interconnected.

In operation of the dekatron counting tube the anode is connected through a resistance to the positive terminal of a relatively high voltage direct current source and the cathodes are returned to the negative terminal of this source through other resistances. Initially one of the anode-cathode paths ionizes and current passes through this stream as well as through the anode and cathode resistances. The anode potential then drops to the voltage necessary to maintain the discharge and the output or signal voltage is taken as the potential difference across the cathode.

The dekatron counting tube is made to count or shift by making the discharge move in a definite pattern from one cathode to another. The potential difference required to transfer the discharge from one cathode to an adjacent cathode is approximately five times that potential necessary for transferring the discharge to the adjacent one of the guide elements. This allows the common interconnection of the first and second guide elements, respectively. The shifting of the discharge is accomplished by supplying a negative pulse to the first guide element whereby the discharge shifts to and rests thereon. Then as the first guide element rises to a positive potential a negative pulse is supplied to the second guide element so that the discharge shifts thereto. As the second guide element rises to a positive potential the discharge shifts to the adjacent cathode.

In FIGURE 5 of the drawing this is represented graphically in shifting the discharge from cathode K1 to cathode K2. Assuming the discharge is initially on cathode K1, a negative pulse 65 is supplied to the first guide element 62 to swing the same negative whereby the discharge is transferred thereto. As the pulse 65 swings positive a second negative pulse 66 is supplied to the second guide element 63 to transfer the discharge thereto. As the pulse 66 swings positive the discharge shifts to the cathode K2. This shifting between the adjacent cathodes may be accomplished in a very short time interval—one thousandth of a second, for example.

Dekatron counting tubes are known in the art and in and of themselves do not form a part of the present invention. However, as will be hereinafter more fully apparent, these counting tubes are employed in a new and novel manner in the control circuit disclosed herein.

The anodes 61 of the dekatron counting tubes V502 and V504 are connected by resistors R519 and R529 and conductor 67 to one side of a direct current source, generally indicated by the reference numeral 68, which is connected to transformer secondary T700S2. The other side of the source 68 is grounded and the cathodes K1–K9 of both of the dekatron counting tubes V502 and V504 are each connected to ground through a resistor R515. The cathodes K0 of counting tubes V502 and V504 are also connected to ground through resistors R526 and a common rectifier SR504. Connected to the cathodes K1–K0 of the dekatron counting tube V502 are a plurality of leads each having a prefix A and a numerical suffix corresponding to the cathode to which it is connected. For example, conductor A4 is associated with cathode K4. Each of the conductors A1–A0 lead to contacts of an associated units switch in the sequence steppers portion 14 of the control circuit as will be hereinafter more fully explained. The same type of an arrangement is also provided for the dekatron counting tube V504 with the exception that the reference for the leads have the prefix B and each of these leads extends to an associated tens switch in the sequence steppers portion 14.

The guide elements 62 and 63 of the dekatron counting tube V502 are normally maintained positive with respect to the cathodes K1–K0 thereof by a circuit comprising conductors 70 and 71, resistors R514 and R513, rectifier SR505 and conductor 72 which leads to a positive terminal of a direct current source generally designated by the reference numeral 74. The source 74 is supplied from the transformer secondary T700S4. A similar circuit including the conductor 72, rectifier SR502, resistors R524 and R525 and conductors 76 and 75 is used to supply a positive bias to the guide elements 62 and 63 of the dekatron counting tube V504.

Also connected to the guide elements 62 and 63 of the dekatron counting tube V502 is the transformer secondary T501S1 whose associated primary is connected in parallel with the discharge valve V501 in the counting pulse generator 16 as above described. The transformer secondary T501S1 and a capacitor C507 are directly connected to the first guide elements 62 and are connected to the second guide elements 63 through a RC time delay circuit comprising resistor R514 and capacitor C508.

Between the units dekatron counting tube V502 and the tens dekatron counting tube V504 is a vacuum type discharge valve V503 whose anode is connected through resistor R523 and conductor 77 to a positive terminal of the source 74. The cathode of valve V503 is connected via conductor 78 to another terminal of the source 74 which is of lower positive potential than the conductor 77 and the anode of the valve V503. The control grid of the discharge valve V503 is referenced to ground by a circuit comprising resistor R522, potentiometer P502 and resistor R531 and the potential difference between the cathode of this valve (conductor 78) and ground maintains the valve normally non-conductive. Connected in parallel across the potentiometer P502 is a rectifier SR500 and a transformer secondary T501S2 whose associated primary is connected in parallel with discharge valve V501 of the counting pulse generator 16 of the control circuit. Also connected in the grid circuit for the discharge valve V503 is a capacitor C509 which is adapted to be charged with the upper terminal thereof positive through a resistor R516 when the discharge of the counting tube V502 rests on the cathode K9. The anode of discharge device V503 is also connected with the guide elements 62 of the counting tube V504 through a circuit including capacitor C511 and conductor 76 and to the guide elements 63 through a circuit comprising capacitor C511, on RC circuit composed of resistor R525 and capacitor C512 and conductor 75. The capacitor C511 is charged by by a circuit including the conductor 77, resistor R523, rseistor R524 and conductor 72 when the discharge valve V503 is not conducting. The capacitor C511 is charged with the upper terminal thereof positive as is shown in the drawing.

Connected between a conductor 80 joining the cathodes K0 of the counting tubes V502 and V504 and ground is the transformer secondary T503S whose associated primary is energized in response to conduction of a sequence stepper valve V301 in the sequence steppers portion 14 of the control as will be further explained. A rectifier SR503 is also connected to the conductor 80 by means of a conductor 81 which leads to one terminal of the source 53.

In considering the operation of the sequence timing counters 15 it will be assumed that both of the dekatron counting tubes V502 and V504 are initially conducting on their cathodes K0. After initiation, when discharge valves V500 and V501 in the counting pulse generator are rendered conductive as previously described, a square wave pulse is evidenced in the transformer secondary T501S1 and is applied ot the first and second guide elements 62 and 63 of the counting tube V502. The voltage pulse appearing on first guide elements 62 is negative and essentially the same as that in the transformer secondary T501S1 whereby guide elements 62 immediately swing negative and the discharge is transferred thereto. The voltage pulse appearing on second guide elements 63 is delayed a short period of time due to the action of the RC network—R514 and C508. By the time the pulse is applied to a guide element 63 to swing the same negative the discharge has been transferred to one of the guide elements 62 and this guide element is again swinging positive. Therefore, the discharge will transfer from guide element 62 to one of the guide elements 63. As the guide element 63 swings positive the discharge will be transferred therefrom to the cathode K1. The pulses in the transformer secondary T501S1 occur at a sixty cycle rate and this causes the discharge of the counting tube V502 to be transferred from cathode to cathode at this same rate. Thus, four pulses—representing four cycles of the supply voltage—would cause the discharge of counting tube V502 to rest on cathode K4 and ten pulses would bring the discharge of this tube back to the starting cathode K0.

After the units dekatron counting tube V502 has counted ten pulses the tens dekatron counting tube V504 is caused to count once through the intermediary of the discharge valve V503 and the circuits associated therewith. The guide elements 62 and 63 of the dekatron counting tube V504 are normally maintained positive with respect to the cathodes thereof. The discharge valve V503 is normally maintained non-conductive even though a positive square wave counting pulse evidenced in the transformer secondary T501S2 is applied to the grid of this discharge valve each time valve V501 conducts and the discharge of counting tube V502 is shifted. The amplitude of the pulses appearing across a portion of the potentiometer P502 is, by itself, not sufficient to override the negative cathode bias and cause the valve V503 to conduct. Therefore, when dekatron counting tube V502 counts the pulses, the discharge valve V503 remains non-conductive and the dekatron counting tube V504 does not count.

When the discharge of the dikatron counting tube V502 rests on its cathode K9 the capacitor C509 is charged with the upper terminal thereof positive through the resistor R516. A positive voltage appearing across the capacitor C509 is placed in series with the grid of the discharge valve V503 but this positive voltage is also insufficient, by itself, to allow conduction of this valve. However, when the next pulse is generated by the counting pulse generator 16 and the discharge of counting tube V502 shifts to cathode K0, the additive value of the positive potentials appearing across the charged capacitor C509 and across a portion of the potentiometer P502 is sufficient to overcome the negative bias on the grid of discharge valve V503 whereby the same conducts. The time constant of the discharge circuit for capacitor C509 is such that the same will be discharged prior to the generation of the eleventh pulse. Thus, discharge valve V503 is rendered conductive each time ten pulses are counted by the dekatron counting tube V502.

Conduction of discharge valve V503 effectively disconnects the capacitor C511 from its charging source and the same discharges to produce a square wave pulse across the resistor R524. This pulse is applied immediately to guide elements 62 and then shortly thereafter to guide elements 63 to swing the same successively negative whereby the discharge of counting tube V504 is switched from cathode K0 to cathode K1. Succeeding counts of ten by dekatron counting tube V502 will cause the discharge in counting tube V504 to shift to cathode K2, cathode K3, etc. In this manner, the counting tube V504 counts tens and the tube V502 counts units.

The cathodes of units counting tube V502 are connected to units selector switches by conductors A1–A0 while the cathodes of tens counting tube V504 are connected to tens selector switches by conductors B1–B0. These selector switches are in the sequence steppers portion 14 of the control circuit and will be later described. Before any timed control function is timed (depending upon the number of pulses counted by the sequence timing counters) the counting tubes V502 and V504 are reset whereby the discharges thereof rest on the cathodes K0. For example, if a timed control function is set to extend for fifty-one cycles, at the end of count the discharge of units counting tube V502 will be resting on its cathode K1 and the discharge of tens counting tube V504 will be resting on its cathode K5. To reset the discharges of these counting tubes a pulse which is highly negative is supplied to the transformer secondary T503S in a manner to be later explained whereby the cathodes K0 of both the units and tens dekatron counting tubes are swung negative with respect to the rest of the cathodes and the various guide elements. This causes the discharge to jump from the cathodes that are resting on to the cathodes K0. Rectifier SR503 limits the peak value of this resetting signal.

It will be apparent that the sequence timing counters portion of the control is highly simplified and capable of accurate counting operations. Of particular importance is the disclosed arrangement for triggering the tens dekatron counting tube as the tenth, twentieth, etc. pulses occur. The discharge of the units dekatron counting tube resting on its cathode K9 conditions the system so that the next pulse will cause counting by the tens dekatron counting tube.

It is possible to count any number of pulses from one to ninty-nine with the disclosed sequence timing counters. If longer timed control functions are desired it is only necessary to add a third dekatron counting tube switched in the same manner as counting tube V504 and, of course, appropriate apparatus in the sequence steppers portion would be provided. With an additional dekatron counting tube it would be possible to count any number of pulses from one to nine hundred and ninty-nine.

*Forge delay timing counters*

The forge delay timing counters portion 18 of the control circuit of the present invention is quite similar to the sequence timers counters portion 15 in that it comprises a units dekatorn counting tube V601 and a tens dekatron counting tube V602. Each of the counting tubes V601 and V602 is provided with a plurality of first guide elements 62, a plurality of second guide elements 63, a common anode 61 and ten cathodes K1–K0. The overall operation of the counting tubes V601 and V602 is similar to that of the counting tubes V502 and V504 in that the counting tube V601 counts individual pulses supplied from the counting pulse generator 16 while the counting tube V602 counts multiples of ten pulses.

The anodes 61 of the counting tubes V601 and V602 are connected through resistors R606 and R615, respectively, and conductor 67 to a positive terminal of the direct current source 68. Each of the cathodes K1–K9 of both of these counting tubes is connected to ground through a resistor R617. The cathode K0 of units counting tube V601 is connected to ground through a resistor R517A and a rectifier SR602 while the cathode K0 of the tens counting tube V602 is connected to ground by the rectifier SR602, conductor 270 and resistor R619. Each of the cathodes K1–K0 of the units counting tube V601 is also connected to a lead having the suffix D and a numerical prefix corresponding to the cathode to which it is connected. The same arrangement is provided with respect to the counting tube V602 with the exception that these leads are designated E1–E0. As will be hereinafter more fully explained, the lead D1–D0 extend to and are interconnected with the contacts of a units forge delay switch SW601 while the leads E1–E0 are connected with the contacts of a tens forge delay switch SW600. The units and tens forge delay switches SW601 and SW600 are disposed in the forge and precompression coordinator 17 portion of the control circuit.

A vacuum type discharge valve V600A has its anode connected through resistor R600 and conductor 77 to a positive terminal of the direct current source 74. The cathode of valve V600A is interconnected by conductors 271, 272 and 78 to another positive terminal of the direct current source 74. The conductor 77 is at a higher potential level than the conductor 78 whereby a potential difference exists across the anode and cathode of the valve V600A. The grid of this valve is connected to a resistor R601 and a circuit comprising capacitor C606, potentiometer P600, rectifier SR600 and transformer secondary T600S. Also connected in series with the grid element of this valve by conductor 273 is a resistor R437 which is disposed in the anode-cathode circuit of a forge delay sequence steppers valve V311 in the forge and precompression coordinator 17. The grid circuit for valve V600A is referenced to ground whereby this valve is normally maintained non-conducted due to the potential difference between ground and the cathode thereof.

The transformer secondary T600S has its associated primary T600P connected in parallel with the valve V501 in the counting pulse generator 16. As described above, upon initiation of the foot switch FS a pulse will be evidenced in the transformer primary T600P and the secondary T600S for each complete cycle of the voltage applied across the valves V500 and V501. The pulse appearing in transformer secondary T600S is applied to the grid of valve V600A by potentiometer P600 but this pulse is, by itself, insufficient to condition the valve V600A for conduction. When forge delay sequence steppers valve V311 conducts, as will be later explained, the positive voltage drop across resistor R347 is supplied to the grid of the valve V600A. This voltage drop is also insufficient by itself to cause conduction of this valve. However, when the voltage drop across resistor R437 and the pulse appearing across potentiometer P600 occur at the same time the valve V600A conducts. Thus, valve V600A will not conduct until the forge delay sequence steppers valve V311 is conducting.

The guide elements 62 and 63 of the counting tube V601 are normally maintained positive with respect to the cathodes K1–K0 thereof by means of a circuit including the conductors 278 and 279, resistor R605, capacitor C601, resistor R604 and conductors 280 and 72 leading to a positive terminal of the direct current source 74. Connected in parallel across the resistor R604 is a rectifier SR601 and a transformer primary T602P. The anode of the valve V600A is connected with the guide elements 62 and 63 of the counting tube V601 through capacitor C600 and conductors 278 and 279. When valve V600A is not conducting the capacitor C600 is charged through a circuit including conductor 77, resistor R600, conductor 278, resistor R604 and conductor 280 whereby the left terminal thereof is positive as shown in the drawing. When the valve V600A conducts the capacitor C600 applies a negative pulse to the first guide elements 62 and a short time thereafter when the guide elements 62 begin to swing positive applies a negative pulse to the second guide elements 63. This time lag is afforded by an RC circuit comprising resistor R605 and capacitor C601. This causes the units counting tube V601 to switch its discharge from cathode and cathode in a predetermined successive order.

A second vacuum type discharge valve V600B—disposed between the counting tubes V601 and V602—is connected through a resistor R612 across the conductors 77 and 72 in the same manner as the valve V600A. The grid of valve V600B is connected by resistor R611, a portion of potentiometer P601, conductor 281 and a parallel RC circuit comprising resistor R618 and capacitor C602 to ground. Transformer secondary T602S is connected in parallel with the potentiometer P601. Capacitor C602 is charged through the resistor R607 with the upper terminal thereof positive when the discharge of units counting valve V601 rests on cathode K9. When the next pulse occurs and valve V600A fires a voltage it will appear across the potentiometer P601 which, in combination with the voltage appearing on capacitor C602, is sufficient to trigger the valve V600B.

Conduction of valve V600B causes previously charged capacitor C604 to apply successive negative pulses to the guide elements 62 and 63 of counting tube V602 through a circuit including conductor 282, conductor 283, resistor R614 and capacitor C605. These guide elements are normally maintained at a positive voltage with respect to the cathodes K1–K0 of counting tube V602 by a circuit comprising conductor 280, resistor R613 and rectifier SR604. The arrangement is such that the discharge of the tens counting tube V602 is switched once each time ten pulses are experienced and counted by the units counting tube V601.

Disposed between the conductor 270 and ground is a transformer secondary T601S whose associated primary T601P is disposed in the sequence steppers portion of the control circuit. When transformer secondary T601S is energized a highly negative signal is applied to the cathodes K0 of both of the counting tubes V601 and V602 whereby the discharges of these counting tubes are switched to the cathodes K0. Such a resetting pulse occurs prior to the timing of any welding force timed control period. A rectifier SR605 and conductors 285 and 81 limit the peak value of this resetting signal.

In many respects the sequence timing counters portion and the forge delay timing counters portion are similar. Both embody a pair of interconnected dekatron counting tubes. It will be noted, however, that the provision of separate pairs of dekatron counting tubes allows the welding force timed control periods to be timed and controlled simultaneously with but independently of the welding current timed control periods.

*Sequence steppers*

The sequence steppers portion 14 for the control circuit comprises a plurality of sequence stepper valves V301–V309 and a repeat valve V310 and a plurality of sequence gating valves V312–V320 with each of the latter valves having a triode section designated by the suffix B and a pentode section designated by the suffix A. There is a sequence stepper valve and a sequence gating valve associated with each welding current timed control period of the welding sequence. For example, the squeeze stepper valve V301 and the squeeze gating valve V312 comprise the squeeze time portion of the sequence steppers. Similarly associated pairs of the stepper valves and the gating valves are provided for preheat, weld delay, welding, postheat, quench, temper, hold and off times, as is indicated in the drawing.

The squeeze stepper valve V301 has its cathode connected by a conductor 90 and resistor R302 and capacitor C302 to ground while its anode is connected to the positive terminal of a direct current source 91 which is supplied from the transformer secondary T700S4 by means of a circuit comprising conductor 94, normally open relay contacts CR1Ba, transformer primary T503P, conductor 93, resistor R304 and resistor R303. Connected in parallel across the resistor R303 is a transformer primary T601P and a resistor R602. The transformer secondary T503S for the primary T503P is disposed in the sequence timing counters portion 15 and is adapted to be energized each time any of the stepper valves V301–V310 are conducting to reset the discharges of the units and tens counting tubes V502 and V504 on their starting cathodes K0. The transformer secondary T601S for the primary T601P is situated in the forge delay timing counters portion 18 and when energized is adapted to reset the discharges of the dekatron counting tubes V601 and V602 on their starting cathodes K0. The transformer primary T601P and its associated secondary are adapted to be energized only when the squeeze stepper valve V301 is rendered conductive.

Connected in parallel with the resistor R302 and capacitor C302 is a resistor R970 and a neon tube NE301 which is adapted to light when the squeeze stepper valve V301 conducts. The cathode of the valve V301 is referenced to a negative terminal of the direct current source 53 by a circuit including conductor 95, resistors R307 and R308 and conductor 96. A conductor 97 terminates at a point between the resistors R307 and R308 and, as will be later explained, extends through a resistor R309 to the grid of the triode section V312B of the squeeze gating valve.

The grid of squeeze stepper valve V301 is connected through a resistor R301 and a transformer secondary T300S having a rectifier SR301 in parallel therewith to a conductor 98 which leads to a negative terminal of the direct current source 53. The arrangement is such that a normally negative hold-off bias is applied to the grid of the squeeze stepper valve V301 whereby the same is maintained non-conductive. The transformer primary T300P associated with the transformer secondary T300S is located in the anode-cathode circuit of squeeze valve V2 in the sequence coordinator portion of the control circuit. Providing that the relay contacts CR1Ba are closed when squeeze valve V2 conducts, a signal will be evidenced in transformer secondary T300S which is operative to draw the grid of valve V301 positive whereby this valve will begin to conduct. Conduction of squeeze stepper valve V301 energizes transformer primaries T503P and T601P to reset the discharges of the various dekatron counting tubes on their cathodes K0.

The preheat stepper valve V302 is connected between conductor 93 and ground by a circuit comprising resistor R318, resistor R317 having transformer primary T5P in parallel therewith and resistor R316 having capacitor C306 in parallel therewith. Connected across resistor R316 is a neon tube NE302 and a resistor R970A. The cathode of the preheat stepper valve V302 is also connected to the conductor 96 by conductor 110 and a pair of resistors R321 and R322 and a conductor 111 extends from between the pair of resistors R321 and R322 to the grid of the triode section V313B of the preheat gating valve. The grid circuit for the preheat stepper valve V302 comprises a resistor R315 and a transformer secondary T301S which is referenced to the conductor 98. Interconnecting the anode circuits of the stepper valves V301 and V302 is a conductor 112 having a capacitor C303 disposed therein.

Valve V302 is normally maintained non-conductive due to the presence of a negative hold-off signal on its grid. The primary T301P is connected with the pentode section V312A of the squeeze gating valve in such a manner that when the pentode section and this valve conducts, a signal is evidenced in the transformer secondary T301S which drives the grid of preheat stepper valve V302 positive so that this valve begins to conduct. When squeeze stepper valve V301 conducts the voltage drop across resistor R304 charges the capacitor C303 with the left terminal thereof negative. Thus, when preheat stepper valve V302 conducts the capacitor C303 applies a negative voltage to the anode of the squeeze stepper valve V301 which extinguishes this valve. Conduction of preheat stepper valve V302 energizes the transformer primary T5P and its associated secondaries T5S1 and T5S2 connected in the forge delay and precompression coordinator and the sequence coordinator portions of the control circuit for initiating preheat time and/or ending precompression time. This will be more fully apparent upon considering the operation of the control circuit in its entirety.

The connections of the weld delay, weld, postheat, quench, temper and hold stepper valves V303–V308 are primarily the same as the connections for preheat stepper valve V302. To avoid unnecessary repetition in the specification these connections will not be described in detail. However, it will be noted that the anode circuit of each of these valves V303–V308 has a transformer primary T6–T11P, respectively, connected therein. Also, each of these valves has its cathode referenced to conductor 96 and one of the conductors 111–117 leads to grid of the triode section of the associated gating valve V314B–V319B. The associated secondaries of these transformers are positioned in the sequence coordinator and the forge and precompression coordinator for initiating and/or terminating certain timed control periods of the welding sequence. The grid of each of these stepper valves is supplied with negative hold-off bias by a circuit including one of the transformer secondaries T302S–T307S. The transformer primaries T302P–T307P associated with the secondaries are connected with the preceding ones of the gating valves V313–V318. Thus, the transformer secondary T302S is connected in the grid circuit of the weld delay stepper valve V303 while its primary T302P is connected with the preheat gating valve V313. One of the capacitors C305, C314, C315, C319, C323 and C327 is connected between adjacent anode circuits of the stepper valves V303–V308 whereby each of the stepper valves is automatically extinguished upon conduction of the successive one of the stepper valves. The arrangement is such that one, and only one, of the stepper valves V301–V308 is conducting at any given time. Neon tubes NE303–NE308 are connected with the cathodes of these stepper valves to give a visual indication of which timed control period is taking place at any particular time during a welding sequence. The stepper valves V301–V308 are each adapted to remain conductive throughout the length of their respective timed control periods. For example, if postheat time is employed in the welding sequence then postheat stepper valve V305 will remain conductive during postheat time. Stepper valve V305 will be rendered conductive at the end of weld time and will be extinguished at the beginning of quench time or, if quench time is not employed, at the beginning of the next timed control period.

The various connections of the component circuit elements for the off stepper valve V309 and repeat valve V310 are the same as those previously described in connection with stepper valves V302–V308 with the exception that a repeat-non-repeat switch 120 and certain relay contacts are disposed in their anode circuits. When the movable pointers of switch 120 are in the nonrepeat position the anode circuit for the off stepper valve V309 can be traced through the conductor 121, a movable pointer of switch 120, conductor 122, the normally open relay contacts CR1Ac, the other movable pointer of switch 120, conductor 123, transformer primary T12P and resistor R416. A resistor R415 is disposed in parallel relation with transformer primary T12P and a capacitor C331 interconnects the anode circuits of the hold stepper valve C308 and off stepper valve V309 while a capacitor C336 interconnects the anode circuits of off stepper valve V309 and repeat valve V310. When the movable pointers of the switch 120 are in the nonrepeat position the anode circuit of the repeat valve V310 remains open and the same does not conduct at any time during the welding sequence.

When the movable pointers of switch 120 are in the repeat position the anode circuit for off stepper valve V309 includes conductor 121, the movable pointer of switch 120 and conductor 123. At this time the anode circuit of the repeat valve V310 comprises conductor 124, normally closed relay contacts CR1Ad, conductor 122, the movable pointer of switch 120, conductor 125, transformer primary T13P having a resistor R429 in parallel therewith and a resistor R430. With the movable pointers of the switch 120 set in the repeat position the repeat valve V310 will conduct upon energization of the transformer secondary T309S providing, of course, the relay contacts CR1Ad are closed at this time. It will be noted that a neon tube and a conductor leading to one of the sequence gating valves are not provided for the repeat valve V310. However, such circuit elements are provided for the off stepper valve V309.

In addition to the above, the weld delay, weld, and postheat stepper valves V303–V305 have their cathodes connected by conductors 128–130, respectively, to the contacts of a forge delay initiating selector switch SW603. The switch SW603 is located in the forge and precompression coordinator in a manner and for a purpose to be later described.

Considering now the gating valves V312–V320, it will be noted that the anode of each of the triode sections of these valves—with the exception of the triode section of the weld delay gating valve V314—is connected to a movable pointer of a tens selector switch SW300, SW302, SW304, SW306, SW308, SW310, SW312 or SW314. Each of these tens selector switches has ten contacts which are individually connected by the leads B0–B9 to the cathodes K1–K0 of the tens dekatron counting tube V504 in the sequence timing counters portion of the control circuit. It will thus be seen that the anodes of the triode sections of each of the above mentioned gating valves are connected with preselected ones of the cathodes of the tens dekatron counting tube V504—depending upon the setting the movable pointers of the tens selector switches.

The cathodes of all of the triode sections V312B–V320B of the gating valves are each connected to ground through a resistor R310. The grids of the triode sections V312B–V320B are each connected through a resistor R309 and a suitable conductor (97 or 111–118) to a point intermediate a pair of resistors connected between the cathode of its associated stepper valve and the negative conductor 96. Thus, a negative hold-off bias is applied to the grids of the triode sections V312B–V320B of the gating valves. In the case of the triode section V312B, for example, the negative bias on its grid is supplied from the direct current source 74 through the resistors R308, R307 and R302 to ground whereby a negative potential is normally applied between ground and the conductor 97. This same arrangement is used to maintain the triode sections of all of the other gating valves normally non-conductive. However, when any one of the stepper valves V301–V309 is rendered conductive the voltage drop across its cathode resistor (R302 in the case of squeeze stepper valve V301) changes the bias voltage on the grid of the associated triode section to a positive value whereby the triode section is prepared for conduction. Although one of the triode sections is so prepared for conduction the same will not conduct until its anode circuit is completed through the movable pointer of its associated tens selector switch and the anode-cathode discharge of the tens dekatron counting tube V504. It should be apparent that only one of the triode sections is prepared for conduction or is conducting at any given time since only one of the stepper valves V301–V309 can be conducting at any given time.

The anodes of the pentode sections V312A–V320A of the gating valves are connected to a positive terminal of direct current source 74 by a conductor 99 and the transformer primaries T301P–T309P. As mentioned above, the secondaries T301S–T309S for these transformer primaries are connected in the grid circuits of the stepper valves V302–V310, respectively. When the pentode section V312A of the squeeze gating valve conducts the transformer secondary T310S will be energized to trigger the preheat sequence stepper valve V302. The cathodes of the pentode sections V312A–V320A are all directly connected to a conductor 100 which extends to another positive terminal of the direct current source 74. This last mentioned terminal is at a relatively low positive voltage whereby a substantial potential difference exists between the conductors 99 and 100 across which the various anode-cathode pentode sections V312A–V320A of the gating valves are connected in parallel.

The control grids of the pentode sections of the gating valves are each connected through a resistor R311 and a conductor 140 to the cathode of the triode section associated therewith. Since the cathodes of the triode sections are referenced to ground while the cathodes of the pentode sections are connected to conductor 100 having a positive voltage thereon a hold-off potential will normally be applied to the grids of the pentode sections which maintain these sections non-conducting. If the triode section of one of the gating valves is rendered conductive the resulting voltage drop across its cathode resistor R310 will swing the grid of the pentode section positive with respect to its cathode whereby the same is prepared for conduction if and when a positive control signal is impressed on the screen grid thereof. When the grid of the triode section is driven positive but the triode section is not conducting—due to conduction of the associated sequence stepper valve as above explained—the grid current flowing through resistors R309–R310 will reduce the effective bias on the grid of the pentode section but sufficient bias remains to hold the pentode section non-conductive until the triode section actually conducts.

The grids of all the pentode sections of the gating valves—with the exception of weld delay gating valve V314—are connected to the movable pointers of multiple contact units selector switches SW301, SW303, SW305, SW307, SW309, SW311, SW313 and SW315. Each of these units selector switches has ten contacts which are connected by the conductors A0–A9 to the cathodes K0–K9, respectively, of the units dekatron counting tube V502 which is in a sequence timing counters portion of the control circuit. When the triode section of any gating valve has been rendered conductive whereby the bias is removed from the grid of its associated pentode section and when the discharge of the units counting tube V502 again reaches its cathode which is connected through the movable pointer of the associated units selector switch to the screen grid of the pentode section a positive voltage will be applied to the screen grid of the pentode section which allows this pentode section to conduct. Conduction of the pentode section energizes the transformer primary in the anode-cathode circuit thereof whereby the stepper valve pertaining to the next timed control periods is initiated. Initiation of this succeeding stepper valve extinguishes the preceding stepper valve whereby the negative hold-off bias on the grid of the triode section again gains control to immediately extinguish both the triode and pentode sections of the gating valve.

It will be noted that units and tens selector switches are not provided for the weld delay gating valve V314. In most welding sequences the weld delay time is fixed and therefore the anode of the triode section V314B is connected directly to the cathode K0 of tens counting tube V504 by conductor B0 while the screen grid of the pentode section is connected directly to the cathode K1 of units counting tube V502 by conductor A1. This results in a preset weld delay time of one pulse which corresponds to one cycle. Of course, if a longer weld delay time is desired the anode of the triode section and the screen grid of the pentode section may alternatively be connected to other cathodes of the counting tubes V502–V504. If an adjustable weld delay time is desired suitable multiple contact tens and units selector switches may be provided.

Of particular importance in the sequence steppers portion of the control circuit is the manner in which the resetting transformer primary T503P is energized each time any one of the stepper valves V301–V309 or the repeat valve V310 conducts. Thus, the discharges of the units and tens dekatron counting tubes V502 and V504 are reset on their starting cathodes K0 at the beginning of any timed control period.

Also of importance is the connection of the various gating valves which each have a triode section and pentode section. As will be understood, the outputs of dekatron counting tubes are quite low but the connections of the gating valves allows the outputs of the counting tubes to trigger certain control functions in a desired manner. The pentode section of each of the gating valves will not and cannot conduct unless and until the triode section associated therewith is conducting and the discharge of the units counting tube applies a positive voltage to the screen grid of the pentode section. In this manner it is impossible for any of the gating valves to conduct prior to the initiation of its associated stepper valve and prior to the time when the counting tubes have counted the desired number of pulses. The contacts of all of the various units and tens selector switches are tied directly to the various cathodes of the counting tubes. However, these multiple cathode circuits for the counting tubes are very effectively isolated through the normally non-conducting gating valves V312–V320. As explained above, only one of the gating valves may conduct at any given time and when this one gating valve does conduct it is insured that a proper pulse count has taken place.

*Forge and precompression coordinator*

The forge and precompression coordinator 17 comprises a forge delay initiating valve V650 connected through resistor R651 and by the conductors 151, 46 and 37 to a positive terminal of the direct current source 38. The cathode of forge delay initiating valve V650 is connected to ground by a resistor R652 and the grid circuit for this valve comprises a resistor R650 and a transformer secondary T310S which are connected to a negative terminal of the direct current source 38 by the conductors 152 and 40. The forge delay initiating valve V650 is normally maintained non-conductive due to the negative potential on its grid but this valve is adapted to conduct when transformer secondary T310S conducts. The transformer primary T310P is associated with a forge delay gating valve V321 as will be later explained.

Also connected between the conductor 151 and ground is a forge delay valve V651 having relay CR650 and a resistor R665 in series with the anode thereof. The forge delay valve V651 is normally maintained non-conductive by a negative potential applied to its grid and this grid circuit comprises conductors 35 and 153 and resistors R669 and R664. The grid circuit for the forge delay valve V651 further comprises resistors R662 and R662A which are connected with the right terminal and movable pointer of potentiometer P605. The potentiometer P605 has ten contacts and its movable pointer is connected through a capacitor C651 to ground. The left terminal of the potentiometer P605 is connected by conductor 154 to the cathode of the forge delay initiating valve V650 and the right terminal thereof is also referenced to this cathode through a resistor R671. When forge delay initiating valve V650 conducts the voltage drop across the cathode resistor R652 will cause a neon tube NE650 to light and change the bias voltage on the grid of the forge delay valve V651. The capacitor C651 will charge at a rate determined by the setting of the movable pointer of the potentiometer P605 and when this capacitor is charged to a sufficient extent the forge delay valve V651 will be rendered conductive. The resistance values between the contacts of the potentiometer P605 are such that each contact represents one tenth of a full cycle of a sixty cycle alternating current source. The potentiometer P605—in combination with the forge delay timing counters portion of the control—allows the forge delay valve V651 to be energized after a timed control period of a predetermined length from zero to ninety-nine cycles which is adjustable in steps of one tenth of a cycle. Energization of the relay CR650 upon conduction of forge delay valve V651 causes certain relay contacts to shift in the electrode actuator 19 to thereby end forge delay time and apply a higher welding force to the electrodes and the workpieces.

A precompression valve V653 has a resistor R673 and a relay CR651—said relay being paralleled by a capacitor C654 and rectifier SR650—connected in series in the anode circuit thereof and this valve V653 is disposed between the conductor 151 and ground. The grid of precompression valve V653 is normally maintained negative by circuit including resistors R672 and R663 and conductors 155 and 152. Connected in parallel across the resistor R663 is a transformer secondary T3S1 having its associated paralleled rectifier SR26 and a pressure selector switch SW602. The three left contacts of pressure selector switch SW602 are not connected while the two right contacts of this switch are shunted and connected to one terminal of the transformer secondary T3S1. Only when the movable pointer of the pressure selector switch SW602 is on either of the two right contacts thereof is transformer secondary T3S1 operatively connected in the grid circuit of precompression valve V653. The transformer primary T3P is located in the anode circuit of squeeze valve V2 in the sequence coordinator whereby when squeeze valve V2 conducts a positive signal is evidenced in transformer secondary T3S1 to drive the grid of precompression valve V653 positive whereby this valve will also conduct providing the movable pointer of pressure selector switch SW602 is on either of its two right contacts. If the movable pointer of the switch SW602 is on any of its three left contacts the precompression valve V653 will not conduct during a welding sequence.

The anode of an extinguishing valve V652 is connected to conductor 151 by resistor R667 and this anode is also connected to the anode circuit of precompression valve V653 by conductor 156 and capacitor C655. When precompression valve V653 conducts the capacitor C655 is charged with the left terminal thereof positive as shown. However, when extinguishing valve V652 conducts the capacitor C655 applies a negative potential to the anode of precompression valve V653 which extinguishes this last mentioned valve. The cathode of extinguishing valve V652 is, of course, tied to ground.

The grid circuit for extinguishing valve V652 comprises resistors R666 and R668 and conductor 152 so that a normally negative hold-off bias potential is applied to the grid of this valve which prevents conduction of the same. Connected in parallel with the resistor R668 through a conductor 201 and the movable pointer of a pressure selector switch SW602A are a pair of transformer secondaries T5S1 and T6S2—each of which is paralleled by a rectifier SR27. The pressure selector switch SW602A is mechanically interconnected or ganged with the pressure selector switch SW602 and has its right contact connected to one terminal of the transformer secondary T6S2. The second contact from the right of pressure selector switch SW602A is connected to a terminal of transformer secondary T5S1 while the three left contacts thereof are not connected. If the switch SW602A has its movable pointer positioned on any of the three left contacts thereof the extinguishing valve V652 will not be rendered conductive at any time during a welding sequence but if the movable pointer is positioned on either of the two right contacts the extinguishing valve V652 will conduct when either transformer secondary T5S1 or transformer secondary T6S2 is energized. Transformer primary T5P is associated with the preheat stepper valve V302 and transformer primary T6P is connected in the anode circuit of weld delay stepper valve V303. Depending upon the positions of the movable pointers of the pressure selector switches SW602 and SW602A, precompression can be eliminated entirely from the welding sequence or incorporated therein to start at the beginning of squeeze time and to terminate either at the beginning of preheat time or at the beginning of weld delay time as is desired.

Connected across the conductor 151 and ground is a forge delay stepper valve V311 having a resistor R442 in its anode circuit and a pair of resistors R437 and R441 in its cathode circuit. The grid of stepper valve V311 is connected to a negative terminal of the direct current source 63 via resistors R440 and R443 and conductors 160 and 96. Connected in parallel with the resistor R443 and forming a portion of the grid circuit for the forge delay stepper valve V311 is a multiple contact pressure selector switch SW602C, a forge delay initiating selector switch SW603, conductors 128, 129 or 130 and the cathode resistors of either the weld delay, weld or postheat stepper valves V303–V305. The movable pointer of pressure selector switch SW602C is mechanically connected with the movable pointers of pressure selector switches SW602 and SW602A and this switch has the two left contacts thereof grounded. The three right contacts of pressure selector switch SW602C are shunted and interconnected with the movable pointer of the forge delay initiating selector switch SW603. The three contacts of switch SW603 are connected to the conductors 128–130 leading from the stepper valves V303–V305. When the movable pointer of pressure selector switch SW602C is on either of the two left contacts the valve V311 will not conduct during a welding sequence due to the negative bias potential on its grid. However, if the movable pointer of switch SW602C is on any of the three right contacts the forge delay stepper valve V311 will conduct at a time in the welding sequence determined by the setting of the movable pointer of the forge delay initiating selector switch SW603.

As previously set forth, a negative hold-off potential is maintained on the grid of valve V600A in the forge delay timing counters portion of the control circuit through a circuit comprising the resistor R437 and conductor 273. When the forge delay stepper valve V311 conducts the conductor 273 is raised to a positive potential which allows the units and tens counting tubes V601–V602 to begin counting. At this time the discharges of the dekatron counting tubes V601 and V602 are on their starting cathodes K0 since the resetting transformer primary T601P has previously been energized upon conduction of the squeeze stepper valve V301 in the sequence steppers portion of the control circuit.

Connected between the cathode of the forge delay stepper valve V311 and the conductor 160 which has a negative potential thereon are resistors R436 and R439. A conductor 170 extends from a point intermediate the resistors R436 and R439 and through a resistor R431 to the grid of a triode section V321B of a forge delay gating valve V321. The forge delay gating valve V321 has a triode section V321B and a pentode section V321A. The cathode of the triode section is connected through a resistor R432 to ground while the anode of this section is connected to the movable pointer of a forge delay tens selector switch SW600. The ten contacts of the selector switch SW600 are connected by the conductors E0–E9 to the cathodes K0–K9 of the tens dekatron counting tube V602. A normally negative hold-off bias is supplied to the grid of the triode section V321B over conductor 170. However, when forge delay stepper valve V311 conducts the voltage drop across cathode resistors R441 and R437 changes the voltage on the grid of the triode section V321B from negative to positive whereby this triode section is conditioned for conduction. Conduction of the triode section V321B will not occur until the discharge of tens counting tube V602 rests on its cathode which corresponds to the contact on which the movable pointer of the selector switch SW600 is positioned.

The anode of the pentode section V321A is connected through a transformer primary T310P and conductors 171 and 99 to a positive terminal of the direct current source 74 while the cathode of this section is connected by conductors 172 and 100 to a second positive terminal of this direct current source which is at a lower positive potential than the first mentioned terminal of this source. The grid of the pentode section is connected by resistor R433 and conductor 173 to the cathode of the triode section whereby a hold-off bias exists on the grid of the pentode section when the triode section is not conducting. The screen grid of the pentode section V321A is tied by conductor 174 to the movable pointer of a units forge delay selector switch SW601. The ten contacts of the stepper switch SW601 are connected by the leads D1–D0 to the various cathodes K1–K0 of the units dekatron counting tube V601. Conduction of the triode section removes the bias from the grid of the pentode section and when the discharge of counting tube V601 is shifted to its cathode corresponding to the contact on which the movable pointer of switch SW600 is positioned a positive voltage is applied to the pentode section which allows this section to conduct. Conduction of the pentode section V321A energizes transformer primary T310P and its associated secondary T310S in the grid circuit of forge delay initiating valve V650 to a trigger to this last mentioned valve.

It will thus be seen that the welding force timed control periods may be accurately timed and controlled by the forge and precompression coordinator. Forge delay time, if included in the welding sequence, may start either at the beginning of weld delay time, weld time, or postheat time, depending upon the position of the movable pointer of forge delay initiating selector switch SW603. Precompression time cannot be included in the welding sequence unless forge delay time is also included and precompression time, if included in the welding sequence, starts with the beginning of squeeze time and ends at either the end of squeeze time or preheat time in a manner depending upon the setting of the various movable pointers of the mechanically interconnected pressure selector switches SW602, SW602A and SW602C.

*Operation*

Considering now the overall operation of the control circuit above described, it will be assumed that the movable pointers of the repeat-nonrepeat switch 120 are in the nonrepeat positions and that the movable pointers of the pressures selector switches SW602, SW602A and SW602C are positioned on their left contact whereby precompression and forge delay times are eliminated from the welding sequence. Prior to initiation, various circuit breakers, not particularly shown, are closed whereby the power supply transformer primaries T800P and T700P are connected to their supply lines L3 and L1 and the welding transformer is connected through the ignitron contactors portion 12 to the supply lines L1–L3. At this time, only the counting tubes V502, V504, V601 and V602 are conducting with the discharges thereof resting on random ones of their respective cathodes. All other valves or tubes are non-conducting due to negative bias on the grids thereof and/or open anode-cathode circuits. Capacitors C3 and C5 are at this time fully charged with the upper terminals thereof assuming a positive polarity.

To initiate a welding sequence the foot switch FS is closed and capacitor C3 discharges through transformer primary T1P, rectifier SR3, resistor R4, the closed foot switch FS and conductor 21. The transformer primary T2P is also energized through a circuit comprising resistor R3, rectifiers SR1 and SR2, conductor 25, the closed foot switch FS and the conductor 21. The signal in transformer secondary T1S is resulting from the discharge of capacitor C3 applies a positive control voltage to the grid of initiating valve V8 which causes this valve to conduct. Conduction of initiating valve V8 causes a voltage drop across the resistor R26 in the anode-cathode circuit thereof to change the bias voltage on the grid of start valve V1 from negative to positive. Start valve V1 has a phase shifted alternating current voltage applied to its screen grid by the circuit 31 to prevent partial conduction thereof.

When the foot switch FS is closed the relay CR1B is immediately energized to shift the contacts CR1B$a$ in the sequence steppers portion whereby anode voltage is supplied to the stepper valves V301–V309. The signal in transformer secondary T2S1 caused by the closure of foot switch FS drives the grid of valve V500 in the counting pulse generator positive whereby the counting pulse generator begins producing a counting pulse during every complete cycle of the alternating voltage across the valves V500 and V501. These square wave pulses are supplied throughout the entire welding sequence. It will be noted that transformer primary T2P is energized during the entire welding sequence upon closure of the foot switch FS.

Conduction of initiating valve V8 causes the start valve V1 to conduct and the relays CR1 and CR1A are energized to shift the various relay contacts thereof. Contacts CR1$a$ close across the foot switch FS and with conductor 27 provide an interlock so that if the foot switch FS is thereafter opened the welding sequence will continue until completed. The relay contacts CR1$b$ in the conductor 29 close to prepare an interlock for the relay CR2. Other contacts of the relay CR1 close in the electrode actuator 19 to energize a head solenoid, for example, whereby the welding electrodes 250 and 251 move into engagement with the workpieces 253.

Energization of the relay CR1A closes the relay contacts CR1$a$ whereby anode potential is supplied to the weld current control valve V3, preheat valve V5, postheat valve V6, quench and temper valve V7, forge delay initiating valve V650, forge delay valve V651, extinguishing valve V652 and precompression valve V653 and precompression stepper valve V311 while the relay contacts CR1A$b$ closed to prepare the grid circuit of squeeze valve V2. Also, the relay contacts CR1A$c$ close to complete the anode-cathode circuit for off stepper valve V309 and the relay contacts CR1A$d$ in the anode circuit of repeat valve V311 open. When the movable pointers of the repeat-nonrepeat switch 120 are set in the nonrepeat position the anode-cathode circuit for repeat valve V310 remains open and this valve will not conduct during the welding sequence.

After the welding electrodes engage the workpieces and a predetermined pressure has been applied thereto the pressure responsive limit switch LS will close and the relay CR2 will be energized. The relay contacts CR2$a$ close and provide a further interlock for the foot switch FS while the contacts CR2$b$ close to complete and interlock circuit for the relay CR2. The contacts CR2$d$ close to complete the grid circuit for the squeeze valve V2 and the contacts CR2$c$ open to disconnect the fully charged capacitor C5 from its charging source.

The decay of flux in the transformer secondary T2S2—whose associated primary is energized upon the closure of the foot switch FS—causes squeeze valve V2 to conduct whereby the capacitor C5 discharges through the transformer primaries T3P and T300P. The signal in transformer secondary T300S drives the grid of squeeze stepper valve V301 positive whereby this valve conducts. Conduction of squeeze stepper valve V301 energizes the transformer primaries T503P and T601P to reset the discharges of the counting tubes V502, V504, V601 and V602 on their starting cathodes K0. The completed anode-cathode circuit for squeeze stepper valve V301 causes the neon tube NE301 to light and the voltage drop across resistor R304 charges the extinguishing capacitor C303 with the left terminal thereof assuming a negative polarity. When the squeeze stepper valve V301 conducts the voltage drop across the cathode resistor R302 changes the bias voltage on the grid of the triode section V312B of squeeze gating valve V312 to a positive valve whereby this triode section is prepared for conduction. The grid current flowing through resistor R309 and R310 causes a voltage drop across resistor R310 which reduces the effective negative bias on the grid of pentode section V312A. However, at this time, the bias on the grid of the pentode section V312A is still effectively negative whereby this pentode section cannot conduct.

The anode of the triode section V312B is connected to the movable pointer of the squeeze selector switch SW300 while the screen grid of the pentode section is connected to the movable pointer of the squeeze selector switch SW301. It will be remembered that with the conduction of squeeze valve V2 and squeeze stepper valve V301 the discharges of the counting tubes V502 and V504 will be reset to their cathodes K0 and that the counting pulse generator will supply timed square wave pulses to the counting tubes. Thus, at this time, the counting tubes V502 and V504 are registering and counting the pulses supplied by the counting pulse generator.

Assuming a squeeze time of fifteen cycles is desired, the anode of the triode section V312B will be connected to the cathode K1 of tens counting tube V504 by the conductor B1 while the screen grid of the pentode section V312A will be connected to the cathode K5 of the units counting tube V502 by the conductor A5. When the discharge of tens counting tube V504 rests on cathode K1 and output voltage is produced across the cathode resistor R515 of the counting tube which is applied to the anode of the triode section and this triode section conducts through the resistor R310. The voltage drop across resistor R310 swings the bias on the grid of the pentode section V312A to a positive value to prepare it for conduction. When the discharge of units counting tube V502 rests on the cathode K5 an output voltage is produced across its associated cathode resistor R515 which is applied through the units selector switch SW301 to the screen grid of the pentode section V312A. This voltage makes the screen grid of the pentode section positive whereby the pentode section V312A conducts through transformer primary T301P to produce an output signal for ending squeeze time. It will be noted that the counting tubes V502 and V504 provide a very accurate means for counting and registering timed pulses supplied by the counting pulse generator while the squeeze stepper valve and the squeeze gating valve—in combination with the tens and units selector switches SW300 and SW301—provide a means for very accurately and adjustably determining the length of squeeze time.

Conduction of the pentode section V312A and the resultant energization of transformer primary T301S causes preheat stepper valve V302 to conduct. Conduction of preheat stepper valve V302 allows capacitor C303 to apply a negative voltage to the anode of squeeze stepper valve V301 to extinguish this valve. With the extinguishment of squeeze stepper valve V301 the negative biases on the grid of this valve and on the grid of the triode section of the squeeze gating valve V312 gain control to render these valves non-conductive. Squeeze stepper valve V301 and squeeze gating valve V312 remain non-conductive for the balance of the welding sequence.

Preheat time starts when the preheat stepper valve V302 conducts. Conduction of valve V302 energizes the transformer primaries T5P and T503P and capacitor C307 is charged to the voltage drop across resistor R318. The resulting signal in the transformer secondary T503S resets the discharges of counting tubes V502 and V504 on their starting cathodes K0 whereby these counting tubes begin counting preheat time. The voltage drop across resistor R316 in the cathode circuit of preheat stepper valve V302 changes the bias voltage on the grid of the triode section of preheat gating valve V313 to a positive value whereby the triode section of this valve is prepared for conduction.

At the start of squeeze time the squeeze valve V2 conducts and the resulting discharge of capacitor C5 energizes the transformer secondary T3S2 in the grid circuit of preheat valve V5. If preheat time is employed in the welding sequence the grid of preheat valve V5 is driven positive and this valve conducts to energize relay CR900. The contacts of relay CR900 disposed in the heat control portion shift to prepare this portion of the control circuit for preheat time. Conduction of the preheat valve V5 also results in the charging of extinguishing capacitor C11 to a higher value.

When preheat is used the selector switches SW302A and SW303A connect the transformer secondary T5S2 into the grid circuit of the weld current control valve V3. Conduction of the preheat stepper valve V302 energizes this transformer secondary to drive the grid of valve V3 positive whereby the same conducts. Conduction of valve V3 sends a signal over the conductor 47 to the heat control portion which initiates the flow of preheat current to the electrodes and the workpieces. Conduction of valve V3 also charges the capacitor C8 to a higher voltage.

When the counting tubes V502 and V504 have counted preheat time—as determined by the setting of the movable pointers of the various preheat selector switches SW302, SW303, SW302A, SW303A, SW302B and SW303B—both sections of the preheat gating valve V313 will conduct. The operation of the preheat gating valve V313 is identical to that of the squeeze gating valve V312 and to avoid unnecessary repetition will not be described in detail. Conduction of gating valve V313 energizes transformer primary T302P and the signal in its associated secondary T302S causes the weld delay stepper valve V303 to conduct. Capacitor C305 applies a negative voltage to the anode of the preheat stepper valve V302 to extinguish this valve when weld delay stepper valve V303 conducts. The negative biases on the preheat stepper valve V302 and the preheat gating valve V313 again gain control and these valves remain non-conductive for the remainder of the welding sequence.

Conduction of weld delay stepper valve V303 energizes the transformer primaries T6P and T503P. Transformer secondary T503S again resets the discharges of the counting tubes V502 and V504 to their starting cathodes K0 while the signal and transformer secondary T6S1 allows extinguishing valve V4 to conduct momentarily whereby capacitor C11 applies a negative voltage to the anode of preheat valve V5 which extinguishes this valve. The relay CR900 is therefore deenergized and the heat control portion is again set up for weld time. Conduction of extinguishing valve V4 also allows capacitor C8 to apply a negative voltage to the anode of weld current control valve V3 to extinguish the same. This eliminates the signal in the conductor 47 and stops the flow of preheat current.

If preheat time is not used in the welding sequence the various switches SW302, SW302A, SW302B, SW303, SW303A and SW303B have their movable pointers set on their respective left or zero contacts. Transformer secondaries T3S2 and T5S are then disconnected from the grid circuits of the preheat valve V5 and the weld current control valve V3, respectively, whereby these valves remain non-conductive during preheat time. However, preheat stepper valve V302 and preheat gating valve V313 conduct in a manner above described. At the end of squeeze time when squeeze stepper valve V302 conducts transformer secondary T503S resets the discharges of the counting tubes V502 and V504 to their starting cathodes K0. The outputs of these counting tubes are immediately applied to the anode of the triode section and the screen grid of the pentode section of gating valve V313 since the movable pointers of units and tens selector switches SW303 and SW302 are set on their left contacts and are connected by the conductors A0 and B0 directly to the starting cathodes K0 of the counting tubes. The capacitor C306 delays the positive voltage applied to the grid of the triode section of gating valve V313 for a short time interval after preheat stepper valve V302 is rendered conductive to allow the extinguishing capacitor C305 to become charged. After the short delay both sections of the preheat gating valve V313 conduct to energize transformer secondary T302S which immediately allows weld delay stepper valve V303 to conduct. Conduction of weld delay stepper valve V303 allows the capacitor C305 to extinguish the preheat stepper valve V302 and the preheat gating valve V313. When preheat time is not employed in the welding sequence the preheat stepper valve V302 and the preheat gating valve V313 conduct only momentarily—approximately one-sixth of a cycle, for example—whereby weld delay time immediately follows squeeze time in the welding sequence.

Weld delay time starts when the weld delay stepper valve V303 conducts. Energization of the transformer secondary T503S resets the discharges of the counting tubes V502 and V504 on their starting cathodes K0 whereby these counting tubes begin registering pulses for weld delay time. The weld delay time is fixed in the disclosed control circuit and is not adjustable by means of units and tens selector switches. As shown in the drawing, the anode of the triode section V314B is connected directly to the cathode K0 of counting tube V504 by conductor B0 while the screen grid of the pentode section V314A is connected by conductor A1 directly to the cathode K1 of units counting tube V502. This allows for a weld delay time corresponding to one pulse or one cycle. However, a longer weld delay time can be obtained by connecting the anode of the triode section and the screen grid of the pentode section of the weld delay gating valve V314 to other cathodes of the counting tubes V502 and V504. Also, if an adjustable weld delay time is desired, suitable selector switches may be employed.

When weld delay stepper valve V303 conducts the capacitor C314 is charged to the voltage drop across resistor R332 and the bias voltage on the grid of the triode section of the weld delay gating valve V314 changes to a positive value and the triode section of the valve is prepared for conduction. When the counting tubes V502 and V504 have counted the weld delay time the weld delay gating valve V314 conducts through transformer primary T303P to produce an output signal for ending weld delay time. The energization of transformer secondary T303S causes the weld stepper valve V304 to conduct. The capacitor C314 applies a negative voltage to the anode of the weld delay stepper valve V303 to extinguish it when the weld stepper valve V304 conducts. Weld delay gating valve V314 also is rendered non-conducting and both valves V303 and V314 remain non-conductive during the balance of the welding sequence.

Weld time begins when weld stepper valve V304 conducts to energize the transformer primary T7P, charge extinguishing capacitor C315, change the bias voltage on the grid for the triode section V315B of weld gating valve V315 to a positive value and energize transformer primary T503P for resetting the discharges of the counting tubes V502 and V504 on their starting cathodes K0. The signal and transformer secondary T7S drives the grid of weld current control valve V3 positive and this valve conducts to provide a signal in the conductor 47 which triggers the heat control portion of the control circuit to start the flow of welding current to the workpieces and electrodes. When the counting tubes V502 and V504 have counted the weld time—depending upon the settings of movable pointers of the weld tens and units selector switches SW304 and SW305—the gating valve V315 will be rendered fully conductive to energize transformer primary T304P. The control signal in transformer secondary T304S causes the postheat stepper valve V305 to conduct and conduction of this valve allows the capacitor C315 to apply a negative extinguishing potential to the anode of weld stepper valve V304. The weld stepper valve V304 and the weld gating valve V315 are therefore extinguished and remain non-conductive during the remainder of the welding sequence.

Postheat time begins when the stepper valve V305 conducts. Conduction of the postheat stepper valve V305 allows the capacitor C319 to be charged with the left terminal thereof negative, energizes the transformer secondary T503S to reset the discharges of the counting tubes V502 and V504 on their starting cathodes K0, change the bias voltage on the triode section V316B of the postheat gating valve V316 to a positive value and energizes the transformer primary T8P. When postheat is used the movable pointers of selector switches SW306A and SW307A connect transformer secondary T8S into the grid circuit of postheat valve V6. The signal in the transformer secondary T8S upon conduction of postheat stepper valve V305 drives the grid of the postheat valve V6 positive and this valve conducts to energize relay CR901 and to charge capacitor C14. The contacts of relay CR901 are disposed in the heat control portion and close to prepare the heat control portion for postheat welding current. The weld current control valve V3 remains conducting to keep conductor 47 positive whereby current is supplied to the welding electrodes and workpieces.

After postheat time has been counted by the counting tubes V502 and V504 the postheat gating valve V316 conducts fully to produce an output signal in the transformer primary T305P which ends postheat time. The output signal in transformer secondary T305S causes quench stepper valve V306 to conduct and the capacitors C319 extinguishes the postheat stepper valve V305. The postheat stepper valve V305 and the postheat gating valve V316 are returned to their non-conductive state at the end of postheat time. Conduction of the quench stepper valve V306 energizes the transformer primary T9P. The signal in transformer secondary T9S1 momentarily renders the extinguishing valve V4 conductive to enable the capacitor C8 to apply a negative voltage to the anode of weld current conductor valve V3 which extinguishes the same. This causes the signal on the conductor 47 to change from positive to negative whereby the heat control portion stops the flow of welding current.

Conduction of quench stepper valve V306 also energizes transformer secondary T9S2 which is disposed in the grid circuit of quench and temper valve V7. Energization of transformer secondary T9S2 causes the valve V7 to conduct whereby the relay CR902 is energized and the capacitor C14 applies a negative voltage to the anode of postheat valve V6 which extinguishes this latter valve. With the extinguishment of valve V6 the relay CR901 is deenergized and the various contacts thereof shift to restore the heat control portion of the control circuit to settings whereby the same is adapted to supply the current level which flows during weld time.

When postheat time is not employed the movable pointers of the selector switches SW306, SW306A, SW307 and SW307A are positioned on the left or zero contacts. In this manner transformer secondary T8S is effectively disconnected from the grid circuit of postheat valve V6 and is connected into the grid circuit of extinguishing valve V4. At the end of weld time when postheat stepper valve V305 conducts, the signal in transformer secondary T503S resets the discharges of the counting tubes V502 and V504 and the signal in transformer secondary T8S causes extinguishing valve V4 to conduct momentarily thereby enabling capacitor C8 to apply a negative voltage to the anode of weld current control valve V3 which extinguishes this valve. This results in termination of current flowing in the electrodes and workpieces. The outputs from the cathodes K0 of the counting tubes V502 and V504 are immediately applied to the various sections of the postheat gating valve V316 but the capacitor C318 delays the conduction of the sections of this valve by delaying the application of a positive voltage to the grid of the triode section V316B for a very short time period. This time period is sufficient to allow the charging of capacitor C319. When gating valve V316 is fully conductive the signal in the transformer secondary T305S energizes quench stepper valve V306 and capacitor C319 extinguishes the postheat stepper valve V305. The postheat gating valve V316 is also extinguished as the negative bias on the control grid of its triode section regains control. When postheat is not employed the postheat stepper valve V305 conducts for approximately one-sixth of a cycle and if temper time is also eliminated from the welding sequence the postheat valve V6 will be extinguished when the relay contacts CR1a open at the end of the welding sequence.

Quench time starts when the quench stepper valve V306 begins to conduct to energize the transformer primary T503P for resetting the discharges of the counting tubes V502 and V504 on their starting cathodes K0, to change extinguisher C323, to change the bias on the grid of the triode section V317B of the quench gating valve V317 to a positive value and to energize the transformer primary T9P. If temper time is used the signal in the transformer secondary T9S2 drives the grid of quench and temper valve V7 positive whereby this valve conducts. Conduction of quench and temper tube $V_7$ energizes relay CR902 and enables the capacitor C14 to extinguish the postheat valve V6 by applying a negative potential to the anode of this valve. The relay contacts located in the heat control portion of the control circuit associated with the control relay CR902 shift to prepare the heat control portion for temper current level.

When the counting tubes V502 and V504 have counted quench time the quench gating valve V317 is rendered fully conductive to provide an output signal in the transformer primary T306P for ending quench time. The extent or length of quench time will, of course, depend upon the setting of the movable pointers of the quench tens and units selector switches SW308 and SW309. Energization of transformer secondary T306S causes temper stepper valve V307 to conduct and the capacitor C323 extinguishes the quench stepper valve V306. The quench gating valve V317 is also extinguished and these valves remain non-conductive for the balance of the welding sequence.

When quench time is not employed in the welding sequence the movable pointers of the selector switches SW308 and SW309 are positioned on their left or zero contacts whereby at the end of postheat time the quench stepper valve V306 conducts only momentarily to charge the capacitor C323 and trigger the quench gating valve V317. As soon as the voltage on the grid of the triode section and the quench gating valve V317 becomes positive this valve will immediately be rendered fully conductive to trigger the temper stepper valve V307. Conduction of temper stepper valve V307 extinguishes the quench stepper valve V306.

Temper time begins when the temper stepper valve V307 conducts to reset the discharges of the counting tubes V502 and V504 on their zero cathodes, to charge the capacitor C327, to condition the trode section of the temper gating valve V318B for conduction and to energize the transformer primary T10P. When temper time is used the movable pointers of selector switches SW310B and SW311B connect transformer secondary T9S2 into the grid circuit of quench and temper valve V7 whereby this valve is rendered conductive and the relay CR902 is energized at the start of quench time as above described. Also, the movable pointers of temper selector switches SW310A and SW311A effectively connect the transformer secondary T10S into the grid circuit of welding current control valve V3. Thus, when temper stepper valve V307 conducts the signal in the transformer secondary T10S drives the grid of valve V3 positive whereby temper current flows into the electrodes and workpieces and the capacitor C8 is charged to a higher voltage. Heat control is at this time set for temper current level since the relay CR902 and quenching-temper valve V7 have previously been energized.

After the counting tube V502 and V504 have counted the temper time the temper gating valve V318 is rendered fully conductive to energize the transformer primary T307P. The signal in transformer secondary T307S causes the hold stepper valve V308 to conduct whereby capacitor C327 extinguishes the temper stepper valve V307. When valve V307 is rendered non-conductive the temper gating valve V318 is also extinguished. The hold stepper valve V308 energizes the transformer secondary T11S to momentarily cause extinguishing valve V4 to conduct. When valve V4 conducts the capacitor C8 applies a negative voltage to the anode of weld current control valve V3 which extinguishes this valve. The negative voltage on conductor 47 again gains control to stop the flow of temper current.

When temper time is not employed in the welding sequence the movable pointers of the various selector switches SW310, SW310A, SW310B, SW311, SW311A and SW311B are positioned on their left or zero contacts. Transformer secondary T9S2 is then disconnected from the grid circuit of the quench and temper valve V7 and transformer secondary T10S is disconnected from the grid circuit of welding current control valve V3. The temper stepper valve V307 and gating valve V318 will conduct as above described but only for a period of time sufficient to allow the charging of extinguishing capacitor C327 and the triggering hold stepper valve V308. When the hold stepper valve V308 conducts the capacitor C327 applies a negative voltage to the anode of stepper valve V307 which extinguishes same and the temper gating valve V318 is also rendered non-conductive.

Hold time starts with the conduction of hold stepper valve V308 which resets the discharges of the counting tubes V502 and V504 on their starting cathode K0, charges the extinguish capacitor C331, changes the bias on the grid of the triode section V319B of the hold gating valve V319 and energizes the transformer primary T11P. As above described, energization of the transformer secondary T11S allows the extinguishing valve V4 to momentarily conduct whereby the welding current and control valve V3 is extinguished by capacitor C8 if temper time is employed in the welding sequence. The counting tubes V502 and V504 count hold time and when the discharges of these two rest on cathodes corresponding to the setting of the movable pointers of the hold selector switches SW312 and SW313 the hold gating valve V319 will be rendered fully conductive. The signal in the transformer secondary T308S supplied by the conduction of the hold gating valve V319 renders the off stepper valve V309 conductive. At the end of hold time the off stepper valve V309 is energized and allows the capacitor C331 to extinguish hold stepper valve V308. The hold gating valve V319 is also rendered non-conductive when the negative grid voltage on the grid of the triode section thereof gains control.

When the repeat-nonrepeat switch 120 is in the nonrepeat position the off stepper valve V309 conducts through the closed relay contacts CR1Aa to energize transformer primaries T503P and T12P. Transformer secondary T503S provides a resetting signal for the counting tubes V502 and V504 while the transformer secondary T12S provides a signal which allows the extinguishing valve V9 to conduct momentarily whereby capacitor C17 applies a negative voltage to the anode of initiating valve V8 which extinguishes the same. Extinguishment of valve V8 causes the bias voltage on the grid of start valve V1 to change from positive to negative and start valve V1 is rendered non-conductive. The relays CR1 and CR1A are therefore deenergized and their contacts open to remove the interlocks from the foot switch FS and the relay CR2, to deenergize the head solenoid whereby the welding electrodes are retracted from the welded workpieces, to disconnect transformer secondary T2S2 from the grid circuit of squeeze valve V2, to extinguish postheat valve V6 (if temper time is not used) or quench and temper valve V7 (if temper time is used), to stop the generation of counting pulses and to open the anode-cathode circuit of off stepper valve V309 to extinguish this latter valve. As the electrodes separate from the workpieces the pressure limit switch LS opens and the relay CR2 is deenergized. The contacts of relay CR2 are shifted whereby the capacitor C5 is again connected to its charging source, the various interlock circuits are completely open and the transformer secondary T2S2 is completely disconnected from the grid circuit of squeeze valve V2. Initiating valve V8 and start valve V1 will remain non-conducting even though foot switch FS is held closed. When the foot switch is opened the capacitor C3 is again allowed to charge and the control is again ready for another sequence of operation.

The above operation of the control circuit is for nonrepeat operations wherein successive welding sequences are not initiated until the foot switch FS is again depressed. In repeat operations the movable pointers of the repeat-nonrepeat switch 120 are changed to the repeat position the control circuit will automatically cycle through successive welding sequences unless and until the foot switch FS is opened. In repeat operation the function of the control circuit up to the end of hold time when the off stepper valve V309 conducts is the same as that described above in connection with nonrepeat operation.

When off stepper valve V309 conducts the discharges of counting tubes V502 and V504 are reset on the cathodes K0 and the capacitor C331 extinguishes the hold stepper tube V308. Conduction of off stepper valve V309 also conditions the triode section of off gating valve V320 for conduction and energizes the transformer primary T12P and the capacitor C336 is also charged with the left terminal thereof negative. Energization of transformer secondary T12S renders extinguishing valve V9 momentarily conductive whereby capacitor C17 extinguishes initiating valve V8 which in turn extinguishes start valve V1. The various relays CR1 and CR1A are therefore deenergized.

The counting tubes V502 and V504 continue to count off time as long as the foot switch FS remains closed and when off time has been counted—depending upon the position of the movable pointers of off selector switches SW314 and SW315—the off gating valve V320 will be rendered fully conductive to energize transformer primary T309P and provide a signal for ending off time. At the start of off time the relay CR1A is deenergized and the relay contacts CR1Ad close to complete the anode-cathode circuit for repeat valve V310. Energization of transformer secondary T309S upon full conduction of off gating valve V320 causes repeat valve V310 to conduct. The capacitor C336 now applies a voltage to the anode of off stepper valve V309 which extinguishes the same and, of course, the off gating valve V320 is also extinguished.

Conduction of the repeat valve V310 energizes transformer primary T503P to reset the discharges of the counting tubes V502 and V504 on their zero cathodes K0 and energizes transformer primary T13P. The resultant signal in the transformer secondary T13S causes the grid of initiating valve V8 to become positive whereby this valve conducts. Conduction of initiating valve V8 causes a voltage drop across its cathode resistor R26 which allows the start valve V1 to conduct and the sequence of operation is repeated.

The sequence of operation will repeat automatically until the foot switch FS is opened. If the foot switch is opened during any welding sequence and remains open the control circuit will be deenergized at the end of this particular sequence. When the foot switch FS is opened and the relay CR1 is deenergized the relay contacts CR1A open to deenergize the relay CR1B.

In the above described repeat and nonrepeat operations of the control circuit it has been assumed that precompression and forge delay times have been omitted from the welding sequence. If forge delay and precompression times are not included in the welding sequence the pressure selector switches SW602, SW602A and SW602C have their movable pointers positioned on either of the two left contacts thereof. When the movable pointers of these selector switches are so positioned a constant welding force is applied to the welding electrodes and the workpieces during the entire welding sequence. When the pressure selector switches have their movable pointers set on the center contacts forge delay time only will be incorporated in the welding sequence and, depending upon the setting of the movable pointer of the forge delay initiating switch SW603, will either start at the beginning of weld delay time, weld time or postheat time. With the movable pointers of the pressure selector switches set on their right contacts precompression time will also be included in the welding sequence and start at the beginning of squeeze time and end at the beginning of weld delay time. If the movable pointers of the pressure selector switches are set on the second contacts from the right the precompression time will end at the beginning of preheat time. It will be noted that forge delay time must be included in the welding force timed control periods if precompression time is used in the welding sequence.

Assuming initially that the pressure selector switches SW602, SW602A and SW602C have the movable pointers thereof positioned on their center contacts whereby precompression time is eliminated from the welding sequence and further assuming that the movable pointer of forge delay initiating switch SW603 is positioned on its left contact whereby forge delay time will begin at the beginning of weld delay time, at the start of weld delay time when weld delay stepper valve V303 conducts a signal will be applied to the grid of forge delay stepper valve V311 through the conductor 128 and movable pointer of switch SW603, the movable pointer of switch SW602C and resistor 440 whereby the grid of this valve is raised to a positive level which causes forge delay stepper valve V311 to conduct. Conduction of valve V311 changes the bias voltage on the control grid of the triode section V321B of forge delay gating valve V321 whereby this triode section is conditioned for conduction. The voltage drop across cathode resistor R437 when forge delay stepper valve V311 conducts is applied to the grid of valve V600A and enables the counting pulse signal across transformer secondary T600S to cause valve V600A to conduct. Prior to the initiation of valve V600A the discharges of counting tubes V601 and V602 are resting on their starting cathodes K0 since these discharges have been reset thereon when the squeeze stepper valve V301 fires at the beginning of squeeze time and energizes the transformer primary T601P. As soon as forge delay stepper valve V311 conducts the counting tubes V601 and V602 begin counting the pulses and when a predetermined number of these pulses have been counted—depending upon the positions of the movable pointer of the tens and units selector switches SW600 and SW601—both the triode and pentode sections of the forge delay gating valve V321 will conduct to energize the transformer primary T310P.

The signal and transformer secondary T310S renders the forge delay initiating valve V650 conductive and the voltage drop across resistor R652 charges the capacitor C651 through a counting network provided by potentiometer P605 to a forge delay timing of zero to nine-tenths of a cycle—depending upon the position of the movable pointer of the potentiometer P605. The forge delay valve V651 conducts when the charge across the capacitor C651 overrides the normally negative hold-off bias on its grid to energize relay CR650. The forge delay valve V651 conducts a short time after the forge delay initiating valve V650 and this time interval is determined by the position of the movable pointer of the potentiometer P605. Energization of the relay CR650 shifts its associated relay contacts in the electrode actuator whereby a higher or forge pressure is applied to the electrodes and workpieces. When forge delay time is used the valves V650 and V651 and the relay CR650, as well as the forge delay stepper valve V311, are maintained energized until the end of the welding sequence when the relay CR1A is deenergized.

With the movable pointer of forge delay initiating switch SW603 on its center contact the forge delay stepper valve V311 will be rendered conductive upon conduction of the weld stepper valve V304. Likewise, when the pointer of switch SW603 is on its right contact the forge delay stepper valve V311 will be rendered conductive upon conduction of the postheat stepper valve V305.

If precompression time is desired during squeeze time only the movable pointers of switches SW602, SW602A and SW602C are positioned on their second contacts from the right whereby the transformer secondary T3S1 is connected into the grid circuit of precompression valve V653 and transformer secondary T5S1 is connected in the grid circuit of extinguishing valve V652. When the foot switch FS is closed and squeeze valve V2 conducts at the start of squeeze time the discharge of capacitor C6 through transformer primary T3P causes a signal in the secondary T3S1 which draws the grid of precompression valve V653 positive. Precompression valve V653 conducts and energizes relay CR651 whose contacts in the electrode actuator shift so that a relatively high welding force is applied to the electrodes and the workpieces. Conduction of precompression valve V653 also allows the capacitor C655 to charge with the left terminal assuming a positive plurality as shown in the drawing. At the end of squeeze time preheat stepper valve V302 conducts and energizes T5S1 which applies a triggering signal to the grid of extinguishing valve V652. When extinguishing valve V652 conducts the capacitor C655 applies a negative voltage to the anode of precompression valve V653 whereby this valve is extinguished. Relay CR651 is deenergized and its contacts in the electrode actuator shift whereby low welding force is now applied to the electrodes and workpieces. At the end of forge delay time a high welding force is applied upon the energization of relay CR650 as above described.

If precompression is desired during both squeeze and preheat times the movable pointers of the switches SW602, SW602A and SW602C are positioned on their right contacts. The operation is the same as that described immediately above with the exception that the precompression valve V653 is extinguished at the end of preheat time instead of at the end of squeeze time. Transformer secondary T5S1 is disconnected from and transformer secondary T6S2 is connected into the grid circuit of the extinguishing valve V652 by the movable pointer of selector switches SW602. Thus, at the end of preheat time the weld delay stepper valve V303 conducts and transformer secondary T6S2 is energized to render extinguishing valve V652 conductive. Conduction of valve V652 extinguishes the precompression valve V653 to end precompression time and high welding force is again applied to the workpieces and electrodes at the termination of forge delay time as has been previously described.

In FIGURE 6 of the drawing there are shown two graphs depicting a welding sequence completed under the control of the control circuit disclosed herein. The lowermost graph represents the welding current timed control periods while the uppermost graph represents the welding force timed control periods. All of these timed control periods are very accurately adjustable and variable—with the exception of weld delay and precompression times—as is best adapted for any given welding operation. Further, precompression, forge delay, preheat, postheat, quench and temper times may be completely eliminated from the welding sequence if desired. The control circuit of the present invention is extremely versatile in that it allows a very accurate selection and timing of any desired welding sequences best adapted for any welding operation.

Although we have shown and described an illustrated embodiment of the present invention it should be apparent that many changes may be made therein without departing from the intent of the invention. Accordingly reference should be had to the following appended claims.

We claim:

1. A control circuit for resistance welding and the like for very accurately controlling the length of a plurality of successive timed control periods which comprises pulse generating means, means to initiate said pulse generating means, means to count the pulses supplied by said pulse generating means, said means to count comprising a first counting device having an anode, a plurality of cathodes and a plurality of guide elements, a second counting device having an anode, a plurality of cathodes and a plurality of guide elements, means to supply a positive potential to said plurality of guide elements for each of said counting devices, means to superimpose said pulses of said plurality of guide elements for said first counting device to cause the discharge thereof to shift from cathode to cathode in a sequential manner, a normally charged capacitor connected between said plurality of guide elements and said plurality of cathodes of said second counting device, and means to discharge said capacitor each time a predetermined number of pulses have been registered by said first counting device to shift the discharge of said second counting device from cathode to cathode in a sequential manner.

2. Apparatus according to claim 1 further characterized in that said means to discharge comprises a control discharge device having an anode, a cathode and a control grid, said anode and cathode of said control discharge device being connected across said capacitor, means to maintain a normally negative hold-off bias on said control grid of said control discharge device, means to superimpose said pulses on said control grid, said pulses being insufficient by themselves to overcome said negative hold-off bias, a second capacitor, said second capacitor being connected to the control grid of said control discharge device, means to charge said second capacitor, said means to charge comprising a circuit including one anode-cathode discharge path of said first counting device, the charge on said second capacitor being insufficient by itself to overcome said negative hold-off bias on said control grid of said control discharge device, and the arrangement being such that upon the occurrence of the next pulse said control discharge device will be rendered conductive to cause the discharge of said first mentioned capacitor to thereby supply a pulse to said guide elements of said second counting device to shift the discharge thereof.

3. A control circuit for resistance welding and the like for very accurately controlling the length of a plurality of successive timed control periods which comprises pulse generating means, means to initiate said pulse generating means, means to count the pulses supplied by said pulse generating means, said means to count comprising a first and a second counting device each having an anode, a plurality of cathodes and a plurality of guide elements, means for impressing said pulses between said guide elements and said cathodes of said first counting device to switch the discharge thereof from cathode to cathode in response to said pulses, a circuit for supplying pulses to said second counting device, means to initiate said circuit for supplying pulses, and said means for initiating comprising one of said pulses supplied by said pulse generating means after said discharge of said first counting means has been transferred to a predetermined one of said plurality of cathodes thereof.

4. Apparatus according to claim 3 further characterized in that each of said counting devices comprises a starting cathode, means for simultaneously resetting the discharges of said counting devices on said starting cathodes, a plurality of control means each being operated successively in response to a predetermined number of pulses being counted by said counting means, and means for actuating said means for simultaneously resetting each time one of said control means is energized in response to the counting of a predetermined number of said pulses.

5. Apparatus according to claim 4 further comprising means for actuating said means simultaneously resetting the discharges of said counting devices on said starting cathodes in response to initiation of said means to initiate.

6. A control circuit for resistance welding and the like for very accurately controlling the length of a plurality of successive timed control periods which comprises pulse generating means, means to count the pulses supplied by said pulse generating means, said means to count comprising a counting device having an anode, a plurality of guide elements and a plurality of cathodes, means to impress said pulses between said plurality of guide elements and said plurality of cathodes to shift the discharge of said counting device from cathode to cathode in a sequential manner, a plurality of control means, means to sequentially energize said plurality of control means upon the registering of a predetermined number of pulses by said counting device, one of said cathodes of said counting device comprising a starting cathode, means to reset said discharge of said counting device on said starting cathode, means to actuate said means to reset, and said means to actuate being energized each time one of said control means is energized in response to said count-device counting a predetermined number of pulses.

7. Apparatus according to claim 6 further characterized in that said plurality of control means comprises a plurality of discharge devices, said means to reset comprising a transformer having a primary and a secondary, said secondary of said transformer being connected to said starting cathode and operative to supply a highly negative signal thereto, and said primary of said transformer being connected in series relation with each of said plurality of discharge devices.

8. A control circuit for resistance welding machines and the like for very accurately controlling the length of a plurality of successive timed control periods which comprises pulse generating means for supplying a continuous train of timed pulses, means to count said pulses, a first control means, said first control means comprising a first control discharge device, a second control means, said second control means comprising a second control discharge device, each of said control discharge devices comprising an anode, a cathode and a control grid, means to supply a normally negative hold-off bias between the control grids and the cathodes of said first and said second control discharge devices, means to impress a positive firing signal on said control grid of said second control discharge device in response to said means to count counting a second predetermined number of said pulses, and means to extinguish said first control discharge device upon conduction of said second control discharge device.

9. Apparatus according to claim 8 further characterized in that said means to extinguish said first control discharge device comprises a capacitor, said capacitor being connected between said anodes of said control discharge devices, means to charge said capacitor upon conduction of said first control discharge device, means to discharge said capacitor upon conduction of said second control discharge device, and said capacitor being operative to apply a negative extinguishing signal to said anode of said first control discharge device upon actuation of said means to discharge.

10. Apparatus according to claim 8 further characterized in that said means to impress a positive firing signal on said first control discharge device comprises a first gating valve, said means to impress a positive firing signal on said second control discharge device comprising a second gating valve, said means to count comprising a counting device having a plurality of cathodes and a common cathode, means connecting each of said gating valves to predetermined ones of said cathodes of said counting device, means to selectively condition said gating valves for conduction, and each of said gating valves being rendered conductive upon the simultaneous occurrence of said means to selectively condition and the discharge of said counting device resting upon the cathode of said counting device to which said gating valve is connected.

11. A control circuit for resistance welding and the like for very accurately controlling the length of a plurality of timed control periods comprising a counting device having an anode and a plurality of cathodes, one of said cathodes being a starting cathode, means to switch the discharge of said counting device in a continuous timed manner, means to reset said discharge of said counting device on said starting cathode, a plurality of control devices, a gating valve associated with each of said control devices, each of said gating valves being connected to predetermined ones of said cathodes of said counting device, said anode and said cathodes of said counting device being connected across a source of electrical energy, means maintaining said gating valves normally nonresponsive to the discharge of said counting device, and means to selectively render said gating valves responsive to said discharge of said counting device.

12. Apparatus according to claim 11 further characterized in that each of said gating valves comprises an anode, a control grid and a cathode, said anode and said cathode of each of said gating valves being connected in series with a predetermined cathode of said counting device, means to maintain a normally negative hold-off signal between the control grids and the cathodes of said gating valves, means to selectively condition said control grids of said gating valves whereby the same may be rendered conductive, said means to selectively condition each of said gating valves comprising the conduction of the preceding one of said plurality of control devices, and means to initiate conduction in the succeeding one of said control devices when one of said gating valves is selectively conditioned for conduction and when said discharge of said counting device rests on the cathode to which said gating valve is connected.

13. Apparatus according to claim 11 further characterized in that each of said gating valves comprises an anode, a control grid, a screen grid and a cathode, said screen grid being connected in series with a predetermined cathode of said counting devices, means to maintain a hold-off signal on the control grids of said gating valves, means to selectively condition the control grids of said gating valves whereby the same are selectively partially prepared for conduction, said means to selectively condition each of said gating valves comprising the conduction of the preceding one of said control devices, and means to initiate conduction in the succeeding one of said control devices when one of said gating valves has the control grid thereof conditioned and when said discharge of said counting device rests on said cathode thereof connected to said screen grid of said gating valve.

14. A coincident circuit for controlling a resistance welding machine and the like comprising a plurality of gating valves, each of said gating valves comprising a triode section and a pentode section, said triode section having an anode, a cathode and a control grid, said pentode section comprising an anode, a cathode, a screen grid and a control grid, a first plurality of conductors upon which a first control signal selectively appears, a second plurality of conductors upon which a second control signal selectively appears, means connecting the anode and cathode of said triode section with one of said first plurality of conductors, means connecting said screen grid of said pentode section with one of said second plurality of conductors, said control grid of said pentode section being connected to said cathode of said triode section, said anode and said pentode section being connected across a source of electrical energy, means for applying a signal on said control grid of said triode section which maintains the same non-conductive, and means to selectively condition said triode sections of said gating valves for conduction.

15. Apparatus according to claim 14 further characterized in that said first plurality of conductors comprises the contacts of a first switch, said second plurality of conductors comprising the contacts of a second switch, a pair of counting devices each having a plurality of cathodes and an anode, said contacts of said first switch being connected to said plurality of cathodes of one of said counting devices, and said contacts of said second switch being connected to said plurality of cathodes of the other of said counting devices.

16. Apparatus according to claim 14 further characterized in that said means for applying a signal on said control grid of said triode section comprises a source of electrical energy, said control grid of said triode section being connected to the positive terminal of said source, said cathode of said triode section being connected through a resistor to the negative terminal of said source, said control grid of said pentode section being connected to said cathode of said triode section through a resistor, said cathode of said pentode section being connected to a negative terminal of a source of electrical energy, and said negative terminal connected to said cathode of said pentode section being at a positive potential with respect to said cathode of said triode section.

17. A control circuit for resistance welding machines and the like which comprises a first discharge valve, a second discharge valve, an extinguishing valve, each of said valves having an anode, a cathode and a control grid, a source of electrical energy, said first and said second discharge valves having their anodes and cathodes connected in series relation across said source of electrical energy, means for supplying negative hold-off bias between said control grids and said cathodes of said valves, means to superimpose a positive control grid on said control grid of said second discharge valve to render the same conductive, means to superimpose a positive control signal on said control grid of said first discharge to render the same conductive, means to superimpose a positive control signal on the grid of said extinguishing valve to render the same conductive, a capacitor connected between said anode of said extinguishing valve and said anode of said second discharge valve, said capacitor being charged upon conduction of said second discharge valve, and said capacitor being operative to apply a negative extinguishing potential to said anode of said second discharge valve upon conduction of said extinguishing valve.

18. Apparatus according to claim 17 further comprising a second extinguishing valve having an anode, a cathode and a control grid, said control grid of said second extinguishing valve being connected to said control grid of said first extinguishing valve, and a capacitor connected between said anode of said first discharge valve and said anode of said second extinguishing valve.

19. Apparatus according to claim 17 further characterized in that said means to superimpose a positive control signal on said control grid of said first discharge device and said means to superimpose a positive grid signal on said control grid of said extinguishing valve comprises a circuit common to said extinguishing valve and said first discharge device, and means to effectively disconnect said circuit from said first discharge device.

20. A control circuit for resistance welding machines and the like for very accurately controlling the length of a plurality of successive timed control periods which comprises pulse generating means, means to count said pulses, means to control said control periods in response to the pulses counted by said pulse counting means, said pulse generating means comprising a pair of uni-directional discharge devices, a source of alternating electrical energy, said pair of discharge devices being connected in series across said source of alternating electrical energy, one of said discharge devices having a control grid, means applying a normally negative hold-off bias to said control grid, means to superimpose a positive control bias on said control grid to condition said discharge device for conduction, said other discharge device having a control grid, a grid circuit for normally applying negative hold-off bias to said control grid of said other discharge device, a capacitor connected in series with said one discharge device and in parallel with said other discharge device, said capacitor being connected in said grid circuit of said other discharge device and operative to apply a positive control voltage to said control grid of said other discharge device, and the arrangement being such that a pulse is evidenced across said other discharge device for each conduction of said one discharge device.

21. A control circuit for resistance welding machines and the like comprising pulse generating means, said pulse generating means comprising a discharge device, switch means, said discharge device having an anode, a cathode and a control grid, a source of alternating current potential, means connecting said switch means and said anode and said cathode of said discharge device in series relation across said source of alternating current, a grid circuit for said discharge device, said grid circuit comprising a source of direct current potential operative to apply a negative hold-off bias on said control grid, a capacitor, said capacitor being connected in series with said switch and in parallel with said discharge device, and said capacitor further being connected in said grid circuit and operative when charged to apply a positive bias on said control grid of said discharge device to condition the same for conduction.

22. A control circuit for resistance welding machines and the like for very accurately controlling the length of a plurality of successive timed control periods which comprises pulse generating means operative to provide a continuous train of timed pulses, means to count said pulses, a first control means, a second control means, said first control means being energized when said means to count has counted a predetermined number of pulses, means to reset said means to count when said predetermined number of pulses have been counted by said pulse counting means, means to effectively disconnect said first control means and to effectively connect said second control means from said means to count when said predetermined number of pulses has been counted, said second control means being energized when a predetermined number of pulses has been counted by said means to count after actuation of said means to reset, means to control a second plurality of successive timed control periods independently of said first mentioned plurality of timed control periods, said means to control a second plurality of timed control pulses comprising a second pulse counting means, said second pulse counting means being responsive to pulses supplied by said pulse generating means, and means to effectively disconnect said pulse generating means from said second pulse counting means until said first control means is energized.

23. A control circuit for resistance welding and the like for very accurately controlling the length of a first plurality of successive timed control periods and the length of a second plurality of successive timed control periods independently of said first plurality which comprises a pulse generating means, a first means to count said pulses, means responsive to the pulses counted by said first means to count to control said first plurality of successive timed control periods, a second means to count said pulses, means responsive to the pulses counted by said second means to count to control said second plurality of successive timed control periods, said first and said second means to count being responsive to pulses supplied by said pulse generating means, means to render said second means to count responsive to pulses a predetermined time after said first counting means has begun to count pulses, said last mentioned means comprising a discharge device having a control grid, means to supply normally negative hold-off bias to said control grid, means to superimpose on said control grid said pulses, said pulses being insufficient by themselves to overcome said negative hold-off bias, means for supplying a positive control bias to said control grid when said first counting means has counted a predetermined number of pulses, said positive control bias being insufficient by itself to overcome said negative hold-off bias, and said pulses and said positive control bias being sufficient when applied simultaneously to overcome said negative hold-off bias on said control grid to render said discharge valve conductive whereby said second counting means is triggered.

References Cited in the file of this patent

UNITED STATES PATENTS

| | | |
|---|---|---|
| 2,859,339 | Brady | Nov. 4, 1958 |
| 2,862,114 | Solomon | Nov. 25, 1958 |
| 2,898,513 | Townsend | Aug. 4, 1959 |
| 2,931,945 | Sweet | Apr. 5, 1960 |